United States Patent
Miyauchi et al.

(10) Patent No.: US 12,519,417 B2
(45) Date of Patent: Jan. 6, 2026

(54) THERMAL RADIATOR, LIGHT SPECTRUM CONVERSION ELEMENT, PHOTOELECTRIC CONVERSION DEVICE, AND THERMAL RADIATION METHOD

(71) Applicant: JAPAN SCIENCE AND TECHNOLOGY AGENCY, Kawaguchi (JP)

(72) Inventors: Yuhei Miyauchi, Kyoto (JP); Taishi Nishihara, Kyoto (JP); Akira Takakura, Kyoto (JP); Satoru Konabe, Tokyo (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 29 days.

(21) Appl. No.: 18/566,746

(22) PCT Filed: Jun. 8, 2022

(86) PCT No.: PCT/JP2022/023198
§ 371 (c)(1),
(2) Date: Dec. 4, 2023

(87) PCT Pub. No.: WO2022/260109
PCT Pub. Date: Dec. 15, 2022

(65) Prior Publication Data
US 2024/0258955 A1     Aug. 1, 2024

(30) Foreign Application Priority Data
Jun. 8, 2021 (JP) .................... 2021-096124

(51) Int. Cl.
*H02S 10/30* (2014.01)

(52) U.S. Cl.
CPC ................................ *H02S 10/30* (2014.12)

(58) Field of Classification Search
CPC ..................................................... H02S 10/30
See application file for complete search history.

(56) References Cited

U.S. PATENT DOCUMENTS

| | | | | |
|---|---|---|---|---|
| 2009/0126783 A1* | 5/2009 | Lin | ........................ | B82Y 20/00 |
| | | | | 359/885 |
| 2010/0140213 A1* | 6/2010 | Mizukami | .............. | B82Y 40/00 |
| | | | | 209/214 |

(Continued)

FOREIGN PATENT DOCUMENTS

| | | |
|---|---|---|
| JP | 2010138015 A | 6/2010 |
| JP | 2019193418 A | 10/2019 |

OTHER PUBLICATIONS

Gao et al., "Macroscopically Aligned Carbon Nanotubes as a Refractory Platform for Hyperbolic Thermal Emitters", ACS Photonics 2019, 6, 1602-1609. (Year: 2019).*

(Continued)

*Primary Examiner* — Tae-Sik Kang
(74) *Attorney, Agent, or Firm* — KENJA IP LAW PC

(57) ABSTRACT

A thermal radiator (21) includes first carbon nanotubes (CNTs) in which excitons produced based on energy from an energy source have energy consistent with a wavelength region within a range from the visible region to the near-infrared region, wherein the chemical potential of the excitons is maintained higher than zero.

16 Claims, 17 Drawing Sheets

(56) References Cited

U.S. PATENT DOCUMENTS

| | | |
|---|---|---|
| 2014/0060604 A1 | 3/2014 | Boriskina et al. |
| 2016/0164451 A1 | 6/2016 | Lenert et al. |
| 2020/0212840 A1 | 7/2020 | Rotschild |
| 2020/0362236 A1 | 11/2020 | Cui et al. |

OTHER PUBLICATIONS

Nov. 21, 2023, International Preliminary Report on Patentability issued in the International Patent Application No. PCT/JP2022/023198.

Sep. 25, 2024, Office Action issued by the IP Australia in the corresponding Australian Patent Application No. 2022288898.

Aug. 2, 2022, International Search Report issued in the International Patent Application No. PCT/JP2022/023198.

* cited by examiner

THERMAL RADIATOR, LIGHT SPECTRUM CONVERSION ELEMENT, PHOTOELECTRIC CONVERSION DEVICE, AND THERMAL RADIATION METHOD

CROSS-REFERENCE TO RELATED APPLICATION

This application claims priority to Japanese Patent Application No. 2021-096124, filed on Jun. 8, 2021, the entire contents of which are incorporated herein by reference.

TECHNICAL FIELD

The present disclosure relates to a thermal radiator, a light spectrum conversion element, a photoelectric conversion device, and a thermal radiation method.

BACKGROUND

Conventionally, technology related to thermal radiators that utilize energy from energy sources is known. For example, technology to obtain electric power by photovoltaic cells using energy from energy sources is known. For example, technologies called solar thermo-photovoltaics (STPV) and thermo-photovoltaics (TPV) are known. In STPV, light energy of the sun is stored in a thermal radiator. Sunlight with a wide-band spectrum is converted in the thermal radiator into equilibrium thermal radiation with a narrow-band spectrum in a wavelength region in which a solar battery has high power generation efficiency. A photovoltaic cell absorbs such equilibrium thermal radiation to generate electric power. In TPV, a thermal radiator is heated, for example, by gas combustion.

For example, Patent Literature (PTL) 1 describes a photothermal conversion element that uses a film containing semiconductor-type carbon nanotubes (CNTs) as a thermal radiator. In the photothermal conversion element described in PTL 1, narrow-band equilibrium thermal radiation in the near-infrared is generated by the annihilation of excitons produced by thermal energy.

CITATION LIST

Patent Literature

PTL 1: JP 2019-193418 A

SUMMARY

Technical Problem

In conventional technology, all energy from an energy source is converted into heat, for example, by an absorber placed in front of a thermal radiator. Such thermal energy is transmitted to the thermal radiator by thermal conduction and used for narrow-band equilibrium thermal radiation as described above. In this process, part of the heat is lost to the outside in the absorber and the thermal radiator, which causes reduction in energy to be converted into electric power in a photovoltaic cell. It is difficult to make a transmission rate at which the energy from the energy source is finally transmitted to the photovoltaic cell sufficiently higher than a thermal leakage rate in the absorber and the thermal radiator, and there is room for improvement in conversion efficiency with which the electric power is finally obtained in the photovoltaic cell based on the energy from the energy source.

It would be helpful to provide a thermal radiator, a light spectrum conversion element, a photoelectric conversion device, and a thermal radiation method in which radiation intensity based on energy from an energy source is enhanced.

Solution to Problem

The present disclosure is (1)
a thermal radiator containing first carbon nanotubes (CNTs) in which excitons produced based on energy from an energy source have energy consistent with a wavelength region within a range from the visible region to the near-infrared region,
wherein the chemical potential of the excitons is maintained higher than zero.

(2)
In the thermal radiator according to above (1),
the first CNTs may include semiconductor-type CNTs, and
the wavelength region may correspond to a sensitivity region of a photovoltaic cell.

(3)
In the thermal radiator according to above (2),
the diameter d of the first CNTs may be 0.6 nm≤d≤3.5 nm.

(4)
In the thermal radiator according to above (3),
the diameter d may be 0.6 nm≤d≤2.5 nm.

(5)
In the thermal radiator according to any one of above (2) to (4),
the energy from the energy source may include light energy from the sun.

(6)
In the thermal radiator according to above (1),
the first CNTs may include metal-type CNTs.

(7)
In the thermal radiator according to above (6),
the diameter d of the first CNTs may be 1.2 nm≤d≤3.5 nm.

The present disclosure is (8)
a light spectrum conversion element including:
the thermal radiator according to any one of above (2) to (5); and
a light receiving unit attached to the thermal radiator, the light receiving unit being configured to transmit light energy from the energy source to the thermal radiator.

(9)
In the light spectrum conversion element according to above (8),
the thermal radiator may include a radiation layer formed of a single type of the first CNTs; and
the light receiving unit may include at least one absorption layer each formed of semiconductor-type second CNTs different from the first CNTs, the at least one absorption layer being stacked on the radiation layer.

(10)
In the light spectrum conversion element according to above (9),
the second CNTs may be specified by a diameter and a chiral index such that the energy of excitons produced by absorption of the light energy from the energy source is higher than the energy of excitons in the first CNTs.

(11)

In the light spectrum conversion element according to above (9) or (10), the diameters of the first CNTs and the second CNTs may be smaller in the layer located on the side of the energy source.

(12)

In the light spectrum conversion element according to any one of above (9) to (11), for each the first CNTs and the second CNTs, a diameter d may be 0.6 nm≤d≤3.0 nm, and a chiral index (n, m) may include a pair of integers of 5≤n≤50 and 0≤m≤n.

(13)

The light spectrum conversion element according to any one of above (9) to (12) may further include a lower refractive index layer stacked on at least one of both sides of a stacked body including the radiation layer and the at least one absorption layer in a stacking direction, the lower refractive index layer being formed of a material with a lower refractive index than the first CNTs and the second CNTs.

(14)

In the light spectrum conversion element according to any one of above (8) to (13), the light receiving unit may have a hole configured to accept light from the energy source, and a confinement structure configured to confine the light incident through the hole and propagate the light inside, and a surface of the thermal radiator may constitute one face of the confinement structure.

The present disclosure is (15)

a light spectrum conversion element including:

the thermal radiator according to any one of above (2) to (5); and a light receiving unit formed as the same layer as the thermal radiator, the light receiving unit containing semiconductor-type second CNTs different from the first CNTs, the second CNTs being configured to absorb light energy from the energy source and transmit the light energy to the first CNTs.

The present disclosure is (16)

a photoelectric conversion device including:

the thermal radiator according to any one of above (2) to (5), or the light spectrum conversion element according to any one of above (8) to (15); and the photovoltaic cell configured to convert light energy emitted by the annihilation of excitons in the first CNTs into electrical energy.

The present disclosure is (17)

a thermal radiator configured to generate non-equilibrium thermal radiation having energy consistent with a wavelength region within a range from the visible region to the near-infrared region by the annihilation of excitons produced based on energy from an energy source.

The present disclosure is (18)

a light spectrum conversion element including:

a radiation layer formed of a single type of first semiconductor-type CNTs in which excitons produced based on light energy from an energy source have energy consistent with a sensitivity region of a photovoltaic cell; and at least one absorption layer each formed of second semiconductor-type CNTs different from the first semiconductor-type CNTs, the at least one absorption layer being stacked on the radiation layer, the absorption layer being configured to transmit the light energy from the energy source to the radiation layer.

The present disclosure is (19)

a light spectrum conversion element including:

a thermal radiator containing first semiconductor-type CNTs in which excitons produced based on light energy from an energy source have energy consistent with a sensitivity region of a photovoltaic cell; and a light receiving unit attached to the thermal radiator, the light receiving unit being configured to transmit the light energy from the energy source to the thermal radiator, wherein the light receiving unit has a hole configured to accept light from the energy source, and a confinement structure configured to confine the light incident through the hole and propagate the light inside, and a surface of the thermal radiator constitutes one face of the confinement structure.

The present disclosure is (20)

a thermal radiation method including operating, at an operating temperature of 800 K or more, a thermal radiator containing first CNTs in which excitons produced based on energy from an energy source have energy consistent with a wavelength region within a range from the visible region to the near-infrared region.

Advantageous Effect

According to a thermal radiator, a light spectrum conversion element, a photoelectric conversion device, and a thermal radiation method of an embodiment of the present disclosure, radiation intensity based on energy from an energy source is enhanced.

DETAILED DESCRIPTION

Embodiments of the present disclosure will be described below with reference to the drawings.

First Embodiment

Figure 1:
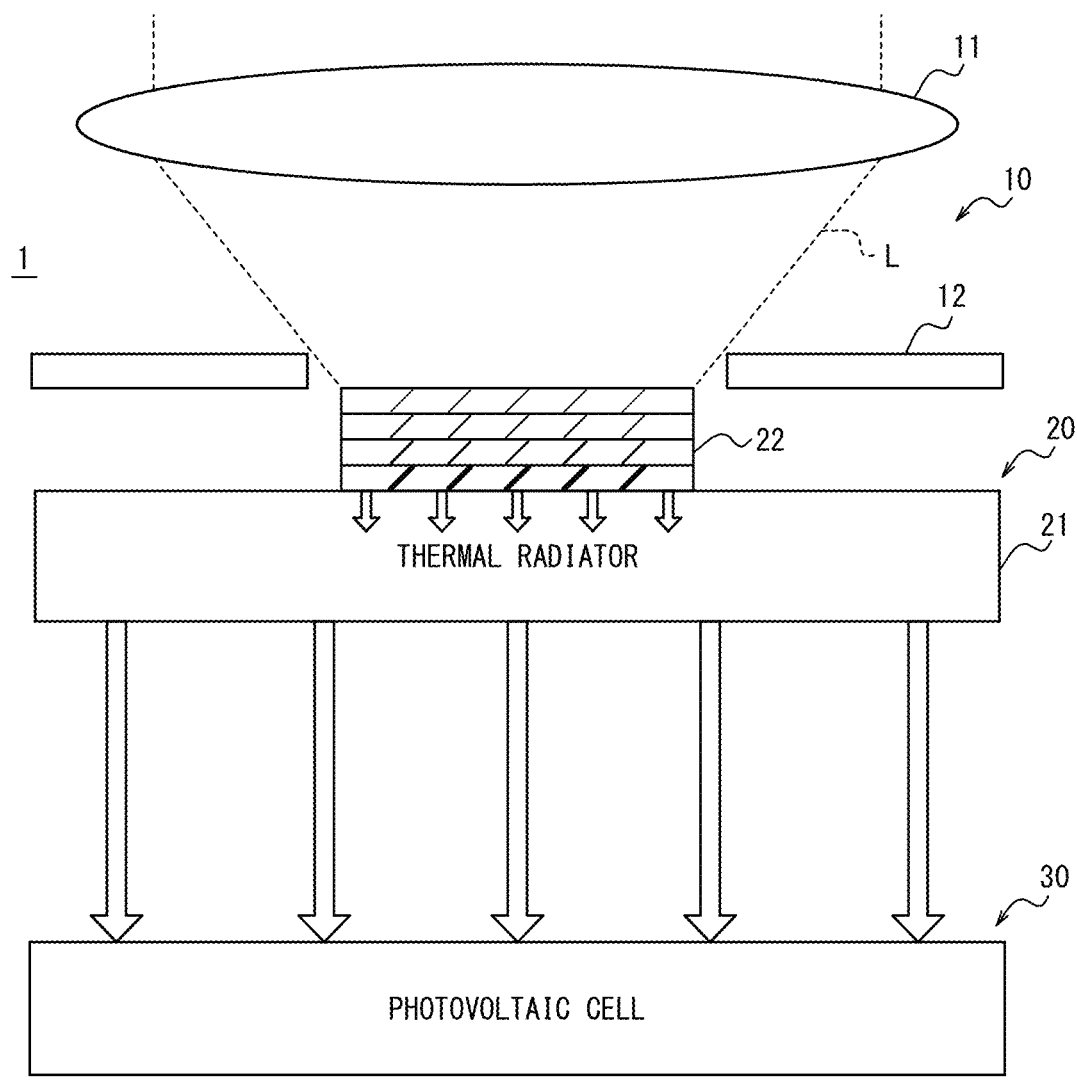
FIG. 1 is a schematic configuration diagram of a photoelectric conversion device according to a first embodiment of the present disclosure.

FIG. 1 is a schematic configuration diagram of a photoelectric conversion device 1 of a first embodiment of the present disclosure. With reference to FIG. 1, the configuration and functions of the photoelectric conversion device 1 of the first embodiment will be mainly described. The photoelectric conversion device 1 has, as major components, a light collection unit 10, a light spectrum conversion element 20, and a photovoltaic cell 30.

The photoelectric conversion device 1 is used, for example, in STPV. The photoelectric conversion device 1 obtains electric power using energy from an energy source. In this specification, "energy from an energy source" includes, for example, light energy from the sun. In other words, the photoelectric conversion device 1 includes a solar battery device that obtains electric power by absorbing sunlight L.

In the photoelectric conversion device 1, in the process from the absorption of the sunlight L to the generation of electricity, the sunlight L having a wide-band spectrum is converted into non-equilibrium thermal radiation having a narrow-band spectrum in a wavelength region in which the photovoltaic cell 30 has high power generation efficiency. The definition of "non-equilibrium thermal radiation" is described below. Such a wavelength region is included in a range from the visible region to the near-infrared region. In this specification, the "visible region" includes, for example, a wavelength region of 400 nm or more and less than 800 nm. The "near-infrared region" includes, for example, a wavelength region of 800 nm or more and less than 3000 nm.

The light collection unit 10 collects the sunlight L and guides the sunlight L to the light spectrum conversion element 20. The light collection unit 10 includes, for example, a lens 11 that guides the sunlight L incident from the outside to the light spectrum conversion element 20. Not limited to this, the light collection unit 10 may include an optical system constituted of another optical component such as a mirror instead of or in addition to the lens 11. The light collection unit 10 has a shield 12 that surrounds the light spectrum conversion element 20 and the photovoltaic cell 30 at position opposite the lens 11 with a surface of the light spectrum conversion element 20 exposed to the side of the lens 11.

The light collection unit 10 collects the sunlight L incident from the outside at a predetermined magnification. In this specification, "predetermined magnification" is included, for example, in a range from 10 times or more to 2000 times or less. In other words, the light collection unit 10 reduces the area of the sunlight L so that the intensity of light corresponding to the light energy of the sunlight L per unit area increases to the predetermined magnification in the light spectrum conversion element 20 after passing through the lens 11.

The light spectrum conversion element 20 has a thermal radiator 21 disposed on the side of the photovoltaic cell 30, and a light receiving unit 22 that is attached to the thermal radiator 21 and transmits energy absorbed by an absorber from the energy source to the thermal radiator 21. The light receiving unit 22 is attached to the thermal radiator 21 so as to be positioned on the side of the light collection unit 10 with respect to the thermal radiator 21.

Figure 2:
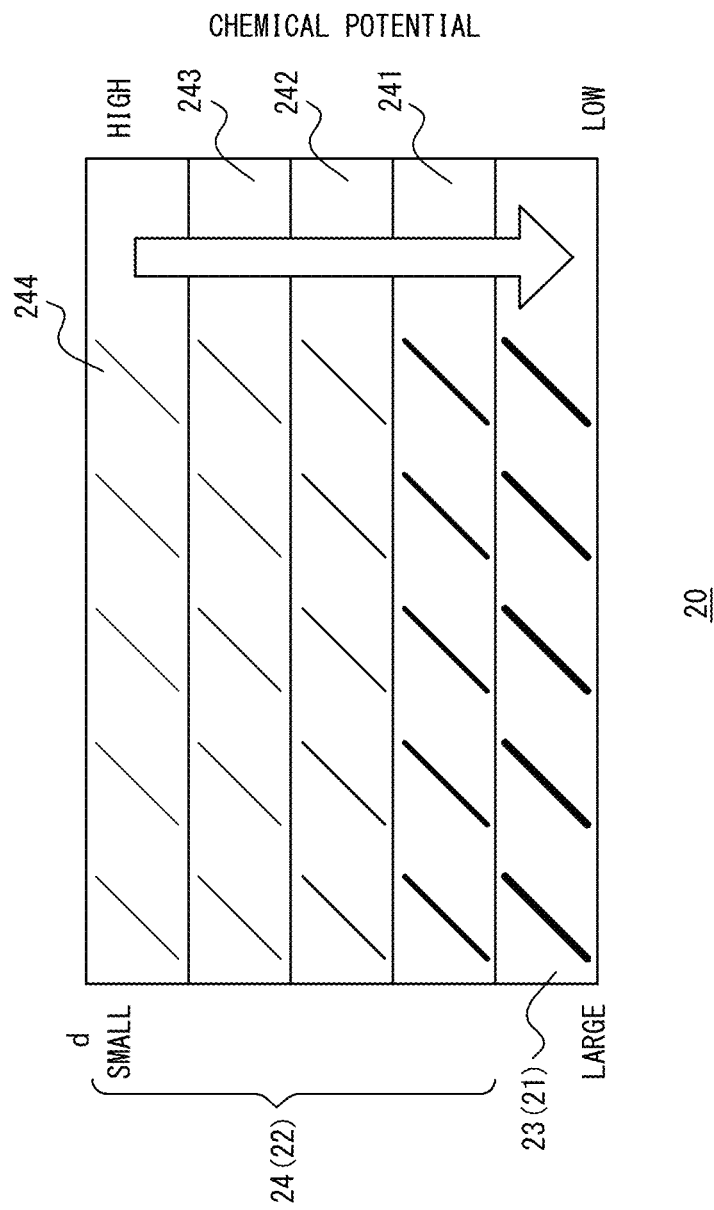
FIG. 2 is a schematic diagram illustrating a stacked structure of a light spectrum conversion element of FIG. 1.

FIG. 2 is a schematic diagram illustrating a stacked structure of the light spectrum conversion element 20 of FIG. 1. With reference to FIGS. 1 and 2, the structure and functions of the light spectrum conversion element 20 will be mainly described. In the first embodiment, the light spectrum conversion element 20 includes a plurality of stacked layers. Each layer contains a single type of semiconductor-type CNTs. The type of semiconductor-type CNTs contained in each of the plurality of layers is different from each other for each layer.

For example, the thermal radiator 21 includes a radiation layer 23 formed of a single type of first semiconductor-type CNTs (first CNTs). The light receiving unit 22 includes at least one absorption layer 24, each formed of a second semiconductor-type CNTs (second CNTs) different from the first semiconductor-type CNTs and stacked on the radiation layer 23. In FIGS. 1 and 2, the number of absorption layers 24 is four, for example, but not limited to this. The number of absorption layers 24 may be any value of one or more.

For example, the radiation layer 23 is disposed on the side closest to the photovoltaic cell 30, among the plurality of layers included in the light spectrum conversion element 20. The radiation layer 23 constitutes the lowest layer in the plurality of layers included in the light spectrum conversion element 20. Four absorption layers 241, 242, 243, and 244 are stacked in sequence on the radiation layer 23. The absorption layer 244 is disposed on the side closest to the energy source, among the plurality of layers included in light spectrum conversion element 20. The absorption layer 244 constitutes the highest layer in the plurality of layers included in the light spectrum conversion element 20.

For example, the second semiconductor-type CNTs contained in the absorption layers 24 may be specified by diameters and chiral indices such that the energy of excitons produced by the absorption of light energy from the energy source, as described below, is higher than the energy of excitons in the first semiconductor-type CNTs contained in the radiation layer 23. For example, the diameters d of the first and second semiconductor-type CNTs may be smaller in the layer located on the side of the energy source. In other words, among the plurality of layers included in the light spectrum conversion element 20, the diameter d of the first semiconductor-type CNTs contained in the radiation layer 23 may be the largest. On the other hand, the diameter d of the second semiconductor-type CNTs contained in each of the four absorption layers 24 may gradually decrease in the order of the absorption layers 241, 242, 243, and 244. For example, the diameters d of the first and second semiconductor-type CNTs may be 0.6 nm or more and 3.5 nm or less. For example, for each of the first semiconductor-type CNTs and the second semiconductor-type CNTs, the diameter d may be 0.6 nm≤d≤3.0 nm, and a chiral index (n, m) may include a pair of integers of 5≤n≤50 and 0≤m≤n.

In the light spectrum conversion element 20 with the layer structure described above, the absorption layers 24 absorb the sunlight L collected by the light collection unit 10, for example, and produce excitons and heat. For example, when the second semiconductor-type CNTs contained in the absorption layers 24 absorb the sunlight L, the excitons are produced based on the light energy from the sun. Such energy of the excitons varies depending on the chiral index of the second semiconductor-type CNTs. In this specification, the "chiral index" is a parameter that determines, for example, the diameter d and helix angle of semiconductor-type CNTs. The diameter d (nm) and the chiral index (n, m) are related to each other by the conversion formula $d=0.249 \times (n^2+m^2+nm)^{0.5}/\pi$. The second semiconductor-type CNTs contained in the absorption layers 24 mainly absorb light at wavelengths corresponding to the energy of the excitons determined according to the chiral indices. The absorption layers 24 also directly absorb light with shorter wavelengths than the wavelengths corresponding to the energy of the excitons of the second semiconductor-type CNTs, due to the generation of higher-order sub-band excitons or the generation of electron-hole pairs in the continuous level in the second semiconductor-type CNTs. This generates heat in the absorption layers 24.

In the light spectrum conversion element 20, a gradient of chemical potential defined for the excitons of the semiconductor-type CNTs is formed due to the layer structure described above based on the diameters d of the semiconductor-type CNTs. For example, the chemical potential of the excitons gradually decreases from the absorption layer 244, on side of the energy source, to the radiation layer 23. The light energy from the sun absorbed in the absorption layers 24 is thereby transmitted to the radiation layer 23 via the excitons.

For example, when the second semiconductor-type CNTs contained in the absorption layer 244 absorb the sunlight L, the excitons are produced in the absorption layer 244. The energy held as the excitons in the absorption layer 244 is transmitted to the adjacent absorption layer 243 by the annihilation of the excitons and the emission of photons. At this time, the energy of the photons to be emitted corresponds to the energy of the excitons determined according to the chiral index of the second semiconductor-type CNTs in the absorption layer 244. In the absorption layer 243, new excitons are produced based on the photons emitted in the absorption layer 244. The energy held as the excitons in the absorption layer 243 is transmitted to the adjacent absorption layer 242 by the annihilation of the excitons and the emission of photons. This process is repeated and finally, in the radiation layer 23, the excitons based on the energy from the energy source are similarly produced. In the above process, the light receiving unit 22, which includes the absorption layers 24, transmits the light energy from the sun to the thermal radiator 21, which includes the radiation layer 23, using the excitons as energy carriers.

In the first semiconductor-type CNTs contained in the radiation layer 23, the excitons produced based on the energy from the energy source have energy consistent with the sensitivity region of the photovoltaic cell 30. The sensitivity region of the photovoltaic cell 30 corresponds to a wavelength region included in the range from the visible region to the near-infrared region. For example, the diameter d of the first semiconductor-type CNTs may be 0.6 nm≤d≤3.5 nm. The chiral index (n, m) of the first semiconductor-type CNTs may include a pair of integers, except for pairs in which n−m is 0 or a multiple of 3. For example, the diameter d of the first semiconductor-type CNTs may be one of the following conditions: 0.6 nm≤d≤1.0 nm, 1.0 nm≤d≤2.0 nm, 2.0 nm≤d≤3.0 nm, 0.6 nm≤d≤2.0 nm, and 0.6 nm≤d≤2.5 nm, and the chiral index (n, m) may include a pair of integers, except for pairs in which n−m is 0 or a multiple of 3. For example, for the first semiconductor-type CNTs, the diameter may be 0.936 nm and the chiral index may be (10, 3). Additionally, the chemical potential of the excitons in the radiation layer 23 is maintained higher than zero.

As described above, the thermal radiator 21, including the radiation layer 23, generates the non-equilibrium thermal radiation having the energy consistent with the sensitivity region of the photovoltaic cell 30 by the annihilation of the excitons produced based on the energy from the energy source. In other words, the thermal radiator 21 generates the non-equilibrium thermal radiation having a narrow-band spectrum in the wavelength region in which the photovoltaic cell 30 has high power generation efficiency. The thermal radiator 21 generates the non-equilibrium thermal radiation having a narrow-band spectrum in an absorption wavelength band of the photovoltaic cell 30.

More specifically, the thermal radiator 21 receives the light energy from the sun transmitted from the light receiving unit 22 using the excitons as the energy carriers, and produces the excitons. In the first semiconductor-type CNTs contained in the radiation layer 23 of the thermal radiator 21, such excitons have the energy consistent with the sensitivity region of the photovoltaic cell 30. The energy of such excitons is included in the energy region corresponding to the wavelength region with high power generation efficiency of the photovoltaic cell 30, i.e., an absorption wavelength band with high absorptivity. Therefore, the light energy obtained by the annihilation of such excitons is also included in the energy region corresponding to the wavelength region with high power generation efficiency of the photovoltaic cell 30. In other words, the non-equilibrium thermal radiation with the energy consistent with the sensitivity region of the photovoltaic cell 30 is generated from the thermal radiator 21.

As described above, when excitons annihilate by radiative recombination, the excitons emit photons equal to their energy. Therefore, CNTs having a diameter and a chiral index that can hold excitons with energy consistent with the sensitivity region of the photovoltaic cell 30 are selected and used as the first semiconductor-type CNTs. This allows photons having energy consistent with the sensitivity region of the photovoltaic cell 30 to be generated.

For example, in the semiconductor band structure, the Fermi levels coincide with each other for thermally excited holes and electrons. In such cases, equilibrium thermal radiation is generated by the annihilation of excitons. On the other hand, when a semiconductor is excited in a steady state not only by heat but also by light having energy higher than an optical gap, the quasi Fermi level of the holes and the quasi Fermi level of the electrons generally deviate from each other, and the difference therebetween corresponds to a chemical potential. Such a state corresponds to a non-equilibrium state. In this specification, "non-equilibrium thermal radiation" includes, for example, thermal radiation generated by the annihilation of excitons or electron-hole pairs in the above non-equilibrium state. Such non-equilibrium thermal radiation obeys the generalized Planck law involving chemical potentials higher than zero.

Referring to FIG. 1, the photovoltaic cell 30 generates electric power by absorbing the non-equilibrium thermal radiation generated in the thermal radiator 21. For example, the photovoltaic cell 30 converts the light energy emitted by the annihilation of the excitons in the first semiconductor-type CNTs contained in the thermal radiator 21 into electrical energy. The photovoltaic cell 30 includes, for example, an InxGa1-xAsySb1-y (0≤x≤100, 0≤y≤100) layer. Not limited to this, the photovoltaic cell 30 may include any layer capable of generating electric power by absorbing the thermal radiation from the thermal radiator 21.

Figure 3:
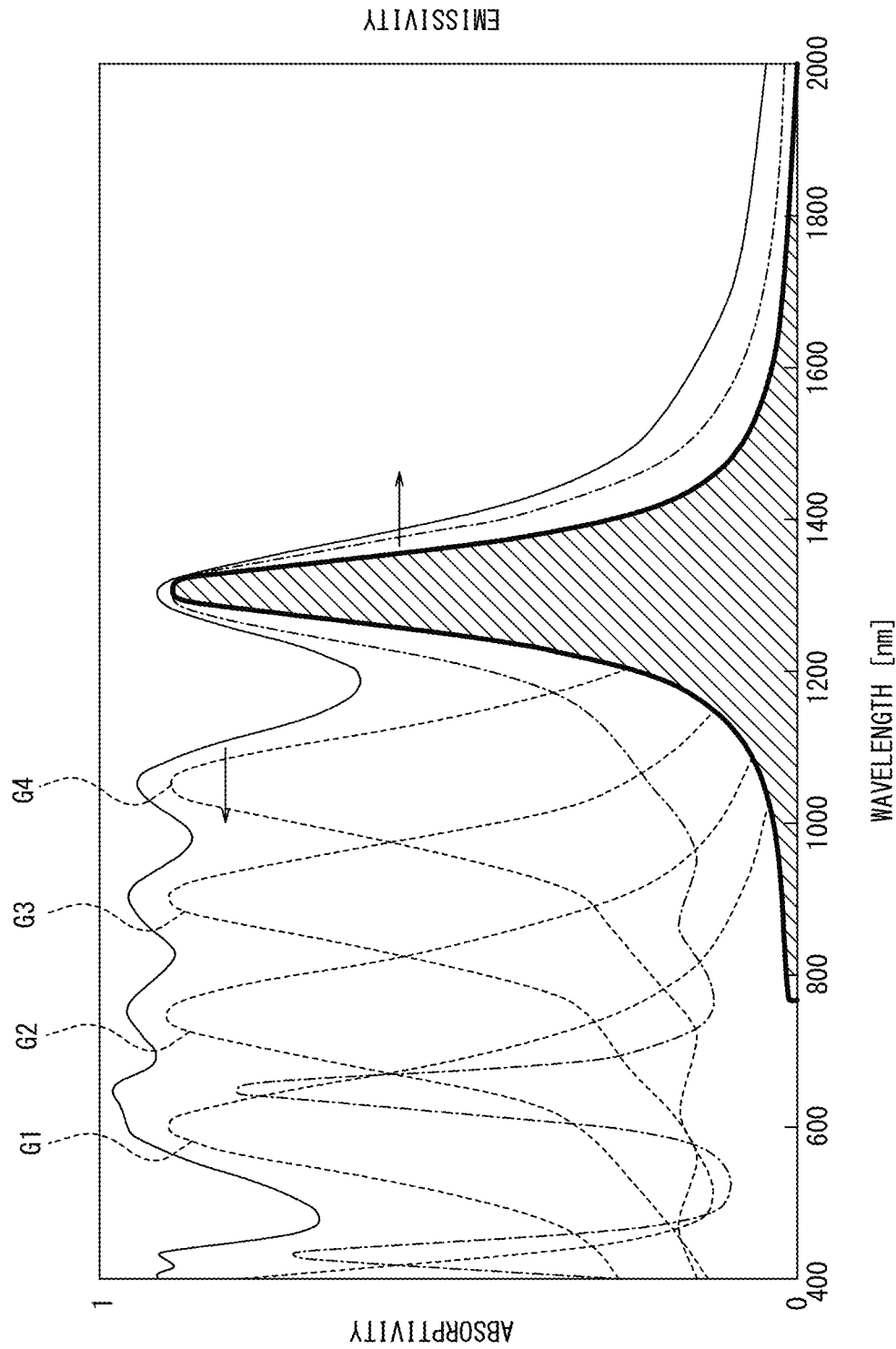
FIG. 3 is a conceptual diagram for explaining spectral characteristics of the light spectrum conversion element of FIG. 2.

FIG. 3 is a conceptual diagram for explaining spectral characteristics of the light spectrum conversion element 20 of FIG. 2. With reference to FIG. 3, an example of the spectral characteristics of the light spectrum conversion element 20 with respect to absorption and emission will be mainly described.

In FIG. 3, each graph represented by a dashed line indicates an absorptivity spectrum of the second semiconductor-type CNTs contained in the corresponding absorption layer 24. For example, a graph G1 indicates an absorptivity spectrum of the second semiconductor-type CNTs contained in the absorption layer 244. For example, a graph G2 indicates an absorptivity spectrum of the second semiconductor-type CNTs contained in the absorption layer 243. For example, a graph G3 indicates an absorptivity spectrum of the second semiconductor-type CNTs contained in the absorption layer 242. For example, a graph G4 indicates an absorptivity spectrum of the second semiconductor-type CNTs contained in the absorption layer 241. A graph represented by a single dotted line indicates an absorptivity spectrum of the first semiconductor-type CNTs contained in the radiation layer 23.

For example, in the light spectrum conversion element 20, the absorption peak of the second semiconductor-type CNTs contained in the absorption layer 24 is positioned on the longer wavelength side, as the absorption layer 24 is disposed on the side of the radiation layer 23 away from the energy source, due to the above-described layer structure based on the diameters d and chiral indices of the semiconductor-type CNTs. The absorption peak of the first semiconductor-type CNTs contained in the radiation layer 23 is positioned at the longest wavelength. In other words, the energy of the excitons produced in the semiconductor-type CNTs decreases from the absorption layer 244 to the radiation layer 23.

In the absorption layers 24 and the radiation layer 23 of the light spectrum conversion element 20, the absorption peak of the second semiconductor-type CNTs and first semiconductor-type CNTs changes stepwise from layer to layer, thus resulting in a very wide absorptivity spectrum over the entire five layers, as represented by the thin solid line in FIG. 3. For example, such an absorptivity spectrum encompasses the entire visible region of wavelengths of 400 nm or more and reaches the near-infrared region around a wavelength of 1300 nm.

Since the absorption peak of the first semiconductor-type CNTs contained in the radiation layer 23 is positioned around a wavelength of 1300 nm, the thermal radiator 21 generates non-equilibrium thermal radiation with a radiation spectrum having a peak wavelength at around 1300 nm, as represented by the thick solid line in FIG. 3. In other words, the non-equilibrium thermal radiation is generated at lower energy (longer wavelength) relative to the light energy of the sun absorbed in the absorption layer 24. The difference in energy at this time is converted into the energy of excitons with non-equilibrium distribution in the light spectrum conversion element 20 while the energy is transmitted from the absorption layers 24 to the radiation layer 23 through the repeated production and annihilation of excitons, for example.

Figure 4:
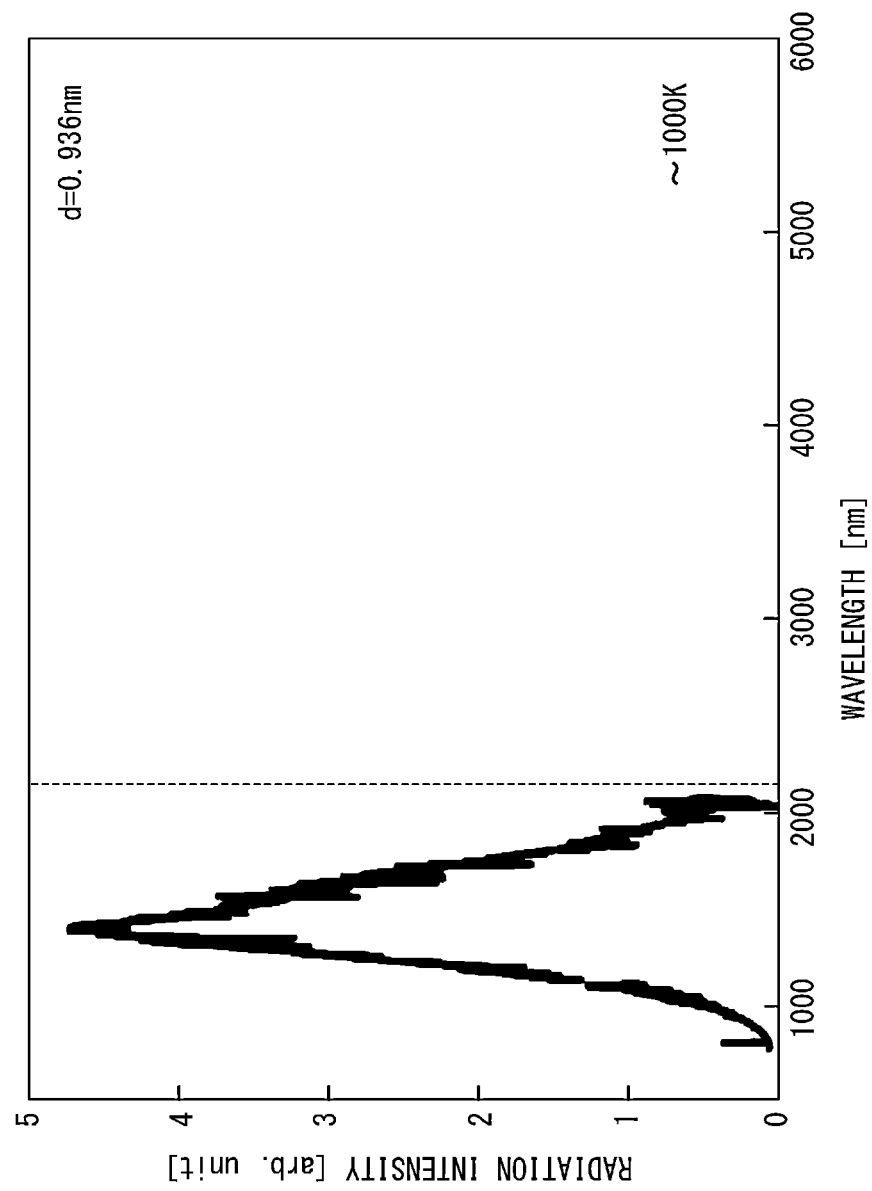
FIG. 4 is a diagram illustrating experimental results of non-equilibrium thermal radiation from a thermal radiator.

FIG. 4 is a diagram illustrating experimental results of non-equilibrium thermal radiation from the thermal radiator 21. FIG. 4 illustrates a radiation spectrum of narrow-band radiation based on the non-equilibrium thermal radiation from the thermal radiator 21. The experimental results illustrated in FIG. 4 are based on the condition that the diameter d is 0.936 nm, the chiral index is (10,3), and the operating temperature is approximately 1000 K for the first semiconductor-type CNTs. The thermal radiator 21 is capable of operating at an operating temperature of 800 K or more, depending on the value of the diameter d of the first semiconductor-type CNTs. Additionally, the thermal radiator 21 is configured as a freestanding film of approximately 1 g/cm$^3$ containing the first semiconductor-type CNTs. Such a thermal radiator 21 is heated by a laser to simulate heating by sunlight.

As illustrated in FIG. 4, the radiation from the thermal radiator 21 based on the non-equilibrium thermal radiation exhibits the radiation spectrum with a peak wavelength at around 1300 nm. The spectral width thereof is narrow enough compared to the wide-band sunlight spectrum that extends over the ultraviolet region, the visible region, and part of the near-infrared region. In addition, the spectral width thereof is narrow enough compared to, for example, a radiation spectrum based on black-body radiation at 1000 K. The radiation spectrum based on black-body radiation at 1000 K has a peak wavelength of the order of 3000 nm and extends over a wide band from the near-infrared region to the far-infrared region.

Figure 5:
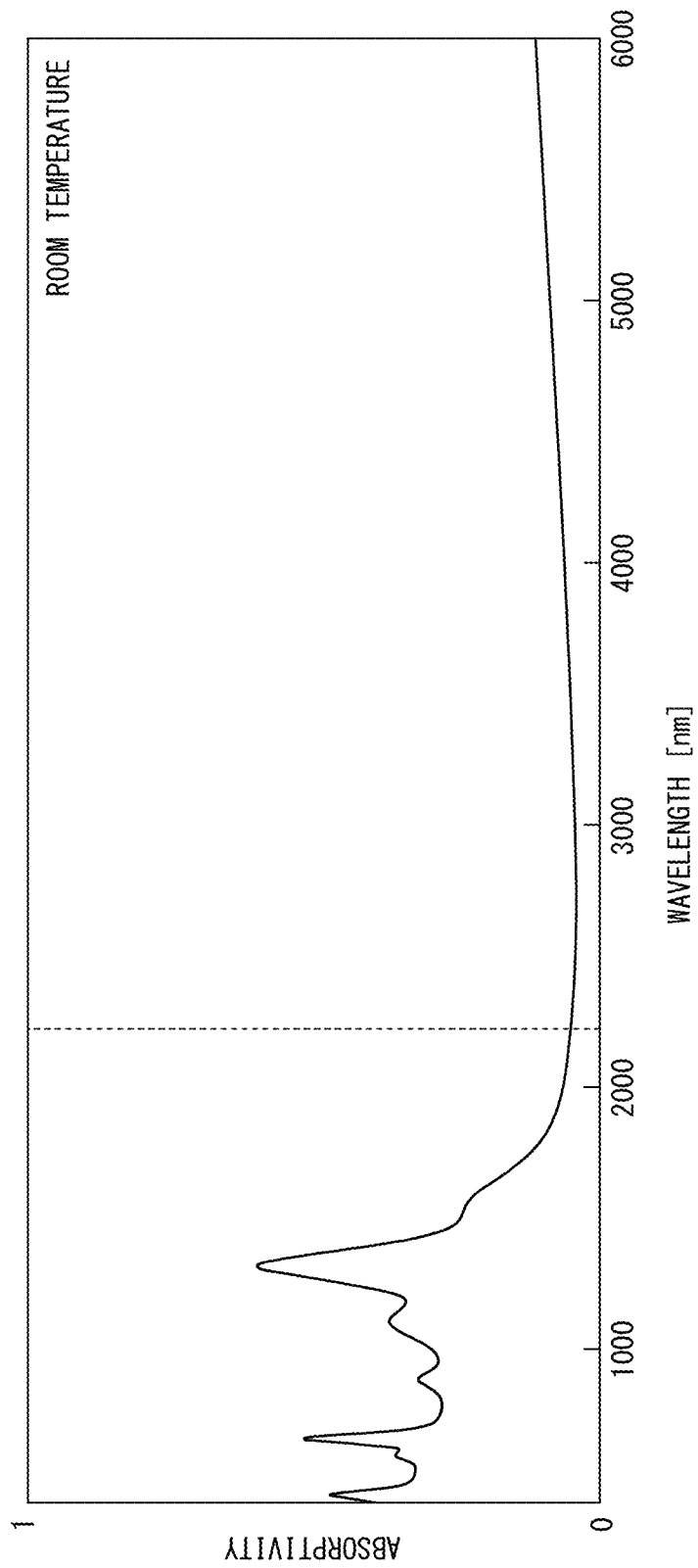
FIG. 5 is a diagram illustrating an absorptivity spectrum of first semiconductor-type CNTs contained in the thermal radiator.

FIG. 5 is a diagram illustrating an absorptivity spectrum of the first semiconductor-type CNTs contained in the thermal radiator 21. The absorptivity spectrum illustrated in FIG. 5 is based on the condition that the first semiconductor-type CNTs are mainly composed of CNTs with a diameter d of 0.936 nm and a chiral index of (10,3), and the temperature is on the order of room temperature. Additionally, the thermal radiator 21 is composed of a film of approximately 1 g/cm$^3$ containing the first semiconductor-type CNTs on sapphire.

As illustrated in FIG. 5, the first semiconductor-type CNTs contained in the thermal radiator 21 have the largest absorption peak at a wavelength of around 1300 nm. On the other hand, at wavelengths longer than 1300 nm, absorptivity is close to zero, and the first semiconductor-type CNTs contained in the thermal radiator 21 absorb almost no light.

Therefore, the thermal radiator 21 generates narrow-band thermal radiation with a radiation peak at a wavelength of around 1300 nm.

Figure 6:
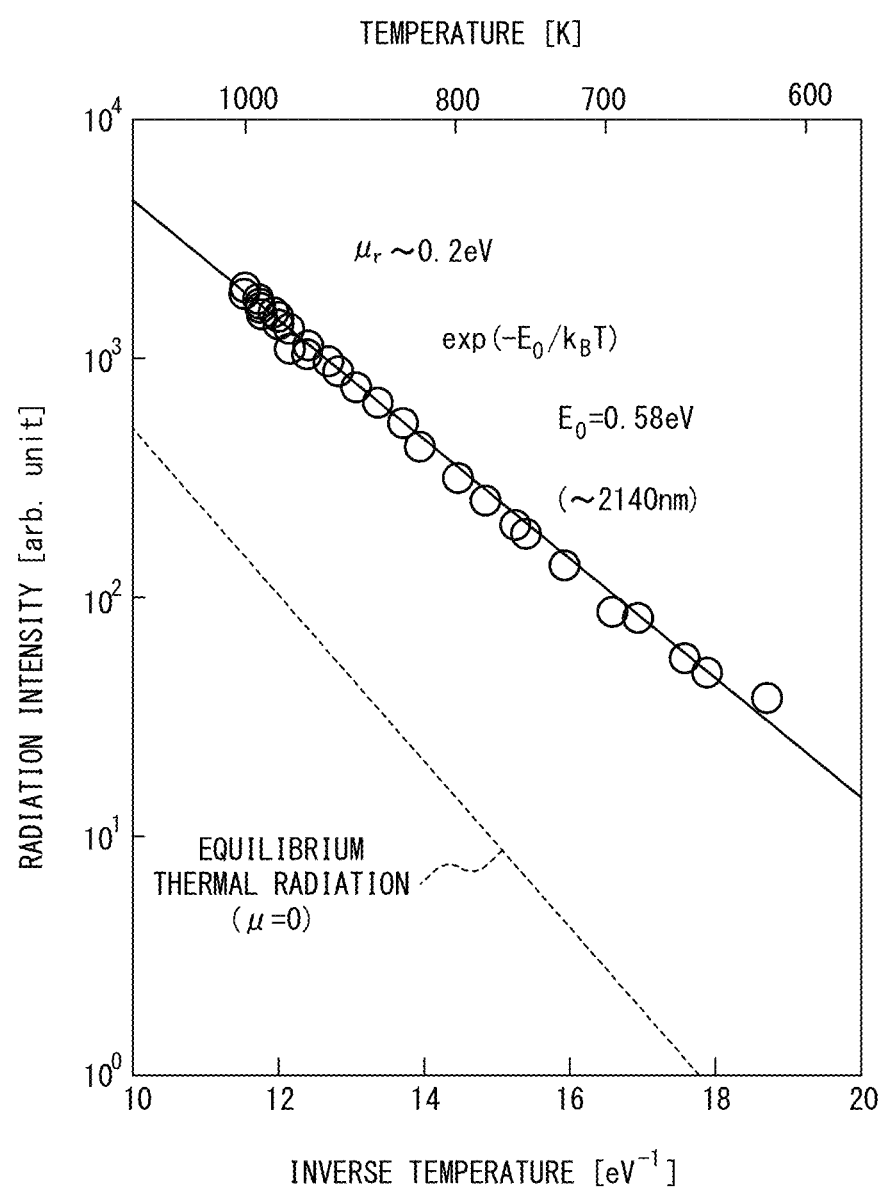
FIG. 6 is a diagram illustrating the temperature dependence of radiation intensity based on the non-equilibrium thermal radiation of FIG. 4.

FIG. 6 is a diagram illustrating the temperature dependence of radiation intensity based on the non-equilibrium thermal radiation of FIG. 4. In FIG. 6, the circles represent experimental results. The solid line overlapping the circles indicates a fitting result based on the generalized Planck law. The dashed line indicates the temperature dependence of radiation intensity based on equilibrium thermal radiation when chemical potential p is zero, according to the Planck law.

The experimental results plotted in FIG. 6 indicate the temperature dependence of higher radiation intensity based on the non-equilibrium thermal radiation, completely deviating from the temperature dependence of radiation intensity based on the equilibrium thermal radiation. By comparing the obtained experimental results with the generalized Planck law, a value of 0.2 eV was obtained as a chemical potential $\mu_r$ when the non-equilibrium thermal radiation occurs. Thus, the chemical potential that is maintained higher than zero in the non-equilibrium thermal radiation can be confirmed from fitting based on the generalized Planck law by measuring radiation intensity from the thermal radiator 21 at different temperatures and applying the generalized Planck law to the temperature dependence of the measured radiation intensity.

The method for confirming that the chemical potential is maintained higher than zero will be described in more detail.

A non-equilibrium thermal radiator to be measured is disposed in a vacuum chamber with a vacuum of $10^{-7}$ atm or less, and light is irradiated onto the non-equilibrium thermal radiator from a light source such as a solar simulator or a laser. The temperature of the non-equilibrium thermal radiator under light irradiation is measured by a calibrated thermocouple, and its radiation intensity is compared with thermal radiation intensity at the same temperature from an object with a known emissivity, such as a quasi-black body. In this case, a metal mask with high reflectance is disposed between the light source and the thermocouple so that the thermocouple is not directly exposed to incident light.

A heat-resistant substrate (sapphire substrate) coated with black body paint JSC-3 (Japansensor Corporation, emissivity is on the order of 0.94) is prepared, as a quasi-black body, and is heated by a ceramic heater (Sakaguchi Electric Heaters Co., LTD., 5 mm square micro-ceramic heater MS-M1000 for 1000° C.). The relationship between the temperature of thermocouple attached to the quasi-black body and a radiation spectrum of the quasi-black body is measured. Next, using the same measurement system, the relationship between the temperature and radiation intensity of CNTs, as the non-equilibrium thermal radiator, is measured.

At the same thermocouple temperature, when the radiation intensity from the non-equilibrium thermal radiator at an exciton resonance wavelength of the CNTs is greater than the radiation intensity from the quasi-black body multiplied by the inverse of the emissivity of the quasi-black body, it can be determined that the chemical potential is maintained higher than zero.

Figure 7:
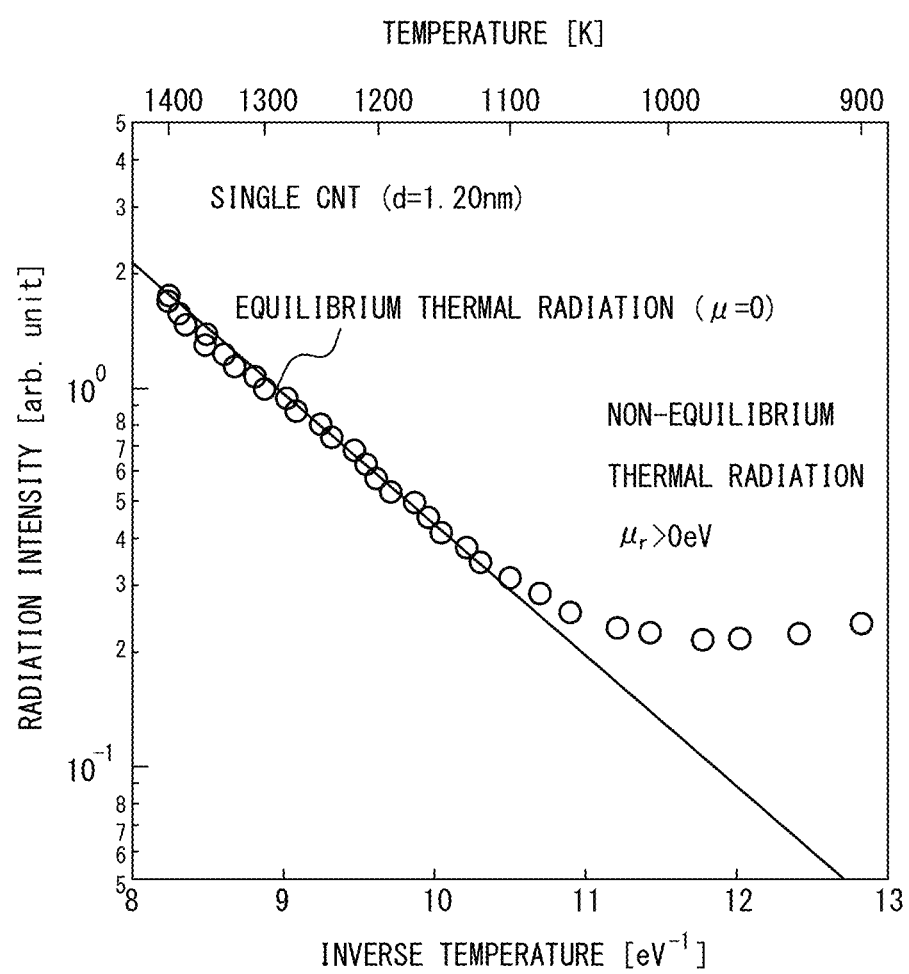
FIG. 7 is a diagram illustrating the temperature dependence of radiation intensity based on radiation from a single first semiconductor-type CNT.

FIG. 7 is a diagram illustrating the temperature dependence of radiation intensity based on radiation from a single first semiconductor-type CNT. In FIG. 7, the circles represent experimental results. The solid line overlapping the circles indicates a fitting result based on the Planck law ($\mu_r$=0). The experimental results illustrated in FIG. 7 are based on the condition that, for the first semiconductor-type CNT, a diameter d is 1.20 nm, and a chiral index is (12, 5). Additionally, one first semiconductor-type CNT is cross-linked in a vacuum chamber and heated by a laser.

In this case, the radiation from the single first semiconductor-type CNT changes from equilibrium thermal radiation to non-equilibrium thermal radiation as temperature varies from a high temperature side around 1400 K to a low temperature side around 1000 K. For example, the radiation from the single first semiconductor-type CNT is equilibrium thermal radiation in a temperature range from 1400 K to around 1100 K, and the chemical potential p becomes zero and follows the Planck law. On the other hand, the radiation from the single first semiconductor-type CNT is non-equilibrium thermal radiation on the low temperature side lower than around 1100 K, and the chemical potential $\mu_r$ becomes higher than zero and deviates from the Planck law.

Figure 8:
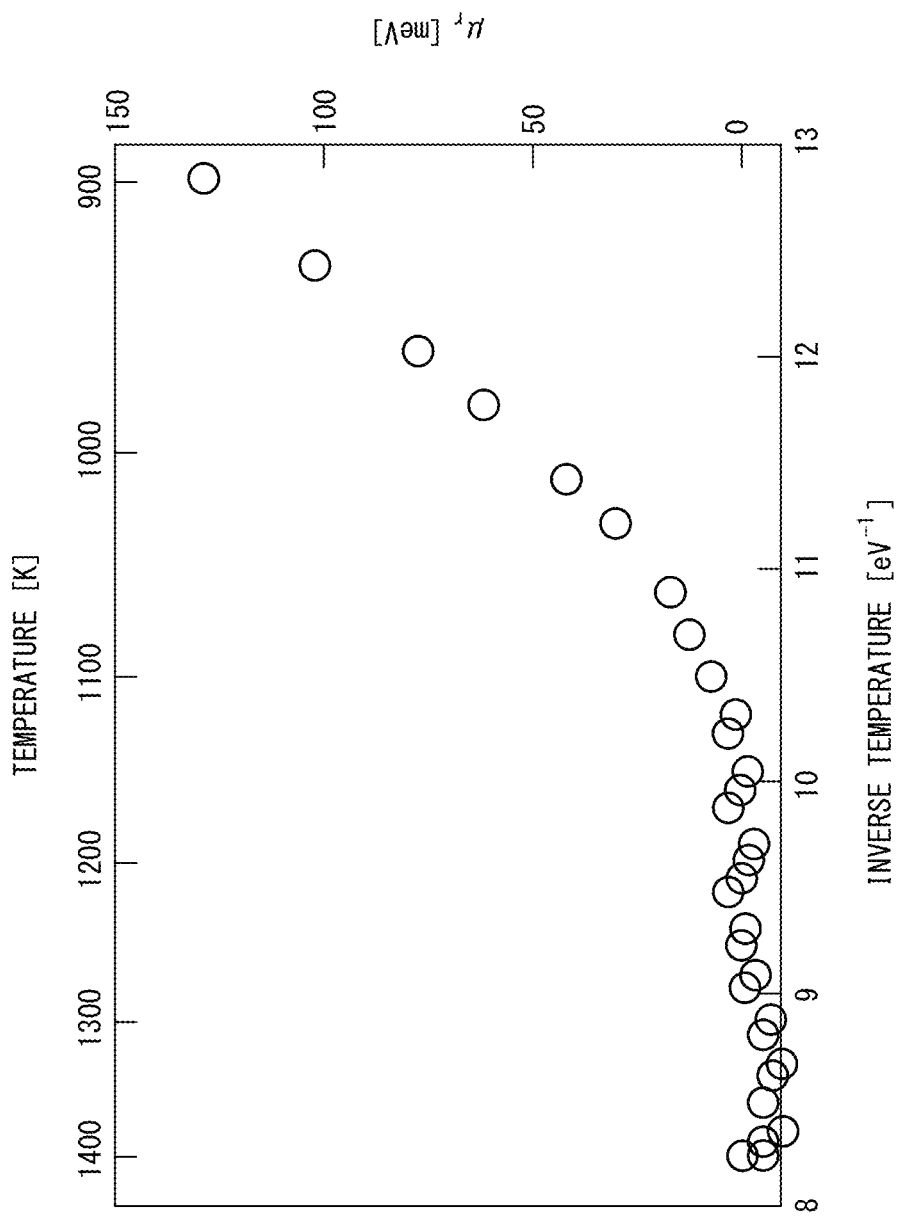
FIG. 8 is a diagram illustrating the temperature dependence of chemical potential estimated based on experimental results of FIG. 7.

FIG. 8 is a diagram illustrating the temperature dependence of the chemical potential $\mu_r$ estimated based on the experimental results of FIG. 7. As illustrated in FIG. 8, the chemical potential $\mu_r$ is higher than zero on the lower temperature side lower than around 1100 K. Even for the first semiconductor-type CNT with the chiral index of (12, 5), for example, a chemical potential $\mu_r$ of the order of 50 meV is obtained at an operating temperature of approximately 1000 K.

Figure 9A:
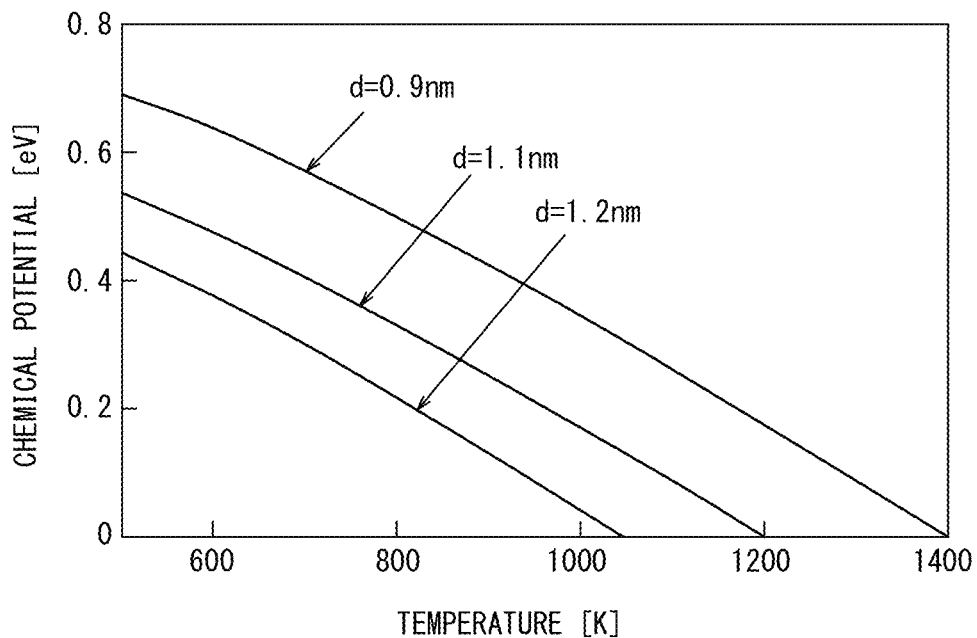
FIG. 9A is a diagram illustrating results based on theoretical calculations.

FIG. 9A is a diagram illustrating results based on theoretical calculations. FIG. 9A illustrates calculation results of the temperature dependence of chemical potential for each different diameter d of the first semiconductor-type CNT. As illustrated in FIG. 9A, the chemical potential tends to increase as the diameter d of the first semiconductor-type CNT decreases. In addition, the smaller the diameter d of the first semiconductor-type CNT, the higher the temperature at which the chemical potential rises from zero.

For example, when the diameter d is 0.9 nm, the chemical potential is higher than 0 at lower temperatures than 1400 K. For example, when the diameter d is 1.1 nm, the chemical potential is higher than 0 at temperatures lower than 1200 K. For example, when the diameter d is 1.2 nm, the chemical potential is higher than 0 at lower temperatures than around 1050 K.

Figure 9B:
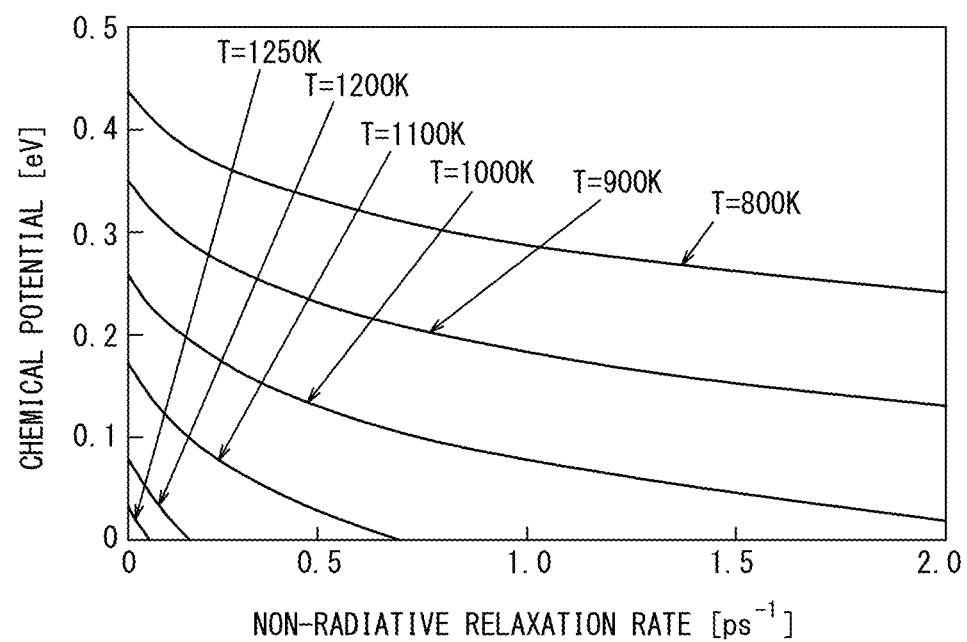
FIG. 9B is a diagram illustrating results based on theoretical calculations.

FIG. 9B is a diagram illustrating results based on theoretical calculations. FIG. 9B illustrates the dependence of the chemical potential on a non-radiative relaxation rate calculated for different temperatures. The diameter d of the first semiconductor-type CNT is 0.9 nm. As illustrated in FIG. 9B, the chemical potential tends to decrease as the non-radiative relaxation rate increases. However, the chemical potential remains high for higher non-radiative relaxation rates at lower temperatures.

As described above, the smaller the diameter d of the first semiconductor-type CNT and the higher the luminescence efficiency, i.e., the lower the non-radiative relaxation rate, the higher the chemical potential.

A method of manufacturing a monolayer film of the radiation layer 23 includes, for example, filtering a solution in which the first semiconductor-type CNTs, as a raw material, are dispersed through a membrane filter. For example, a solution in which the first semiconductor-type CNTs specified by a diameter of 0.936 nm and a chiral index of (10, 3) are dispersed is filtered through a membrane filter. Thereby, only the first semiconductor-type CNTs specified by the diameter of 0.936 nm and the chiral index of (10, 3) are accumulated and form a film. The same process is sequentially performed for a solution in which the second semiconductor-type CNTs are dispersed to form the absorption layer 24. Thereby, a stacked film in which the radiation layer 23 and the absorption layers 24 are stacked is formed.

Figure 10:
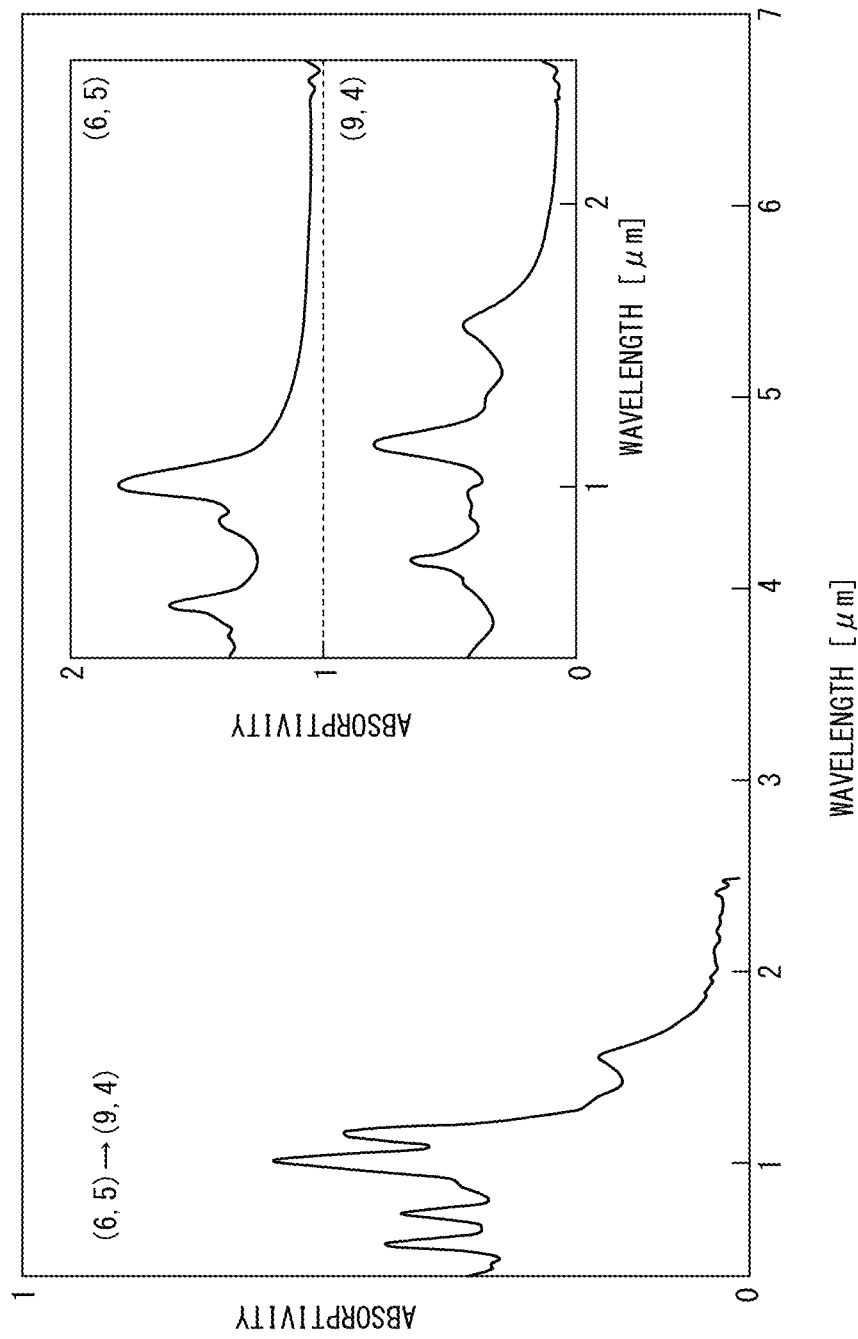
FIG. 10 is a diagram illustrating an example of the manufacture of a stacked film of absorption layers.

FIG. 10 is a diagram illustrating an example of the manufacture of the stacked film of the absorption layers 24. The method of manufacturing the stacked film includes, for example, the process of filtering a solution in which the second semiconductor-type CNTs, as a raw material, are dispersed through a membrane filter. For example, in the example of the manufacture illustrated in FIG. 10, a solution in which the second semiconductor-type CNTs specified by a diameter of 0.757 nm and a chiral index (6, 5) are dispersed is first filtered through a membrane filter. Thereby, only the second semiconductor-type CNTs specified by the diameter of 0.757 nm and the chiral index of (6, 5) are accumulated and form a film. The same process is subsequently performed for the second semiconductor-type CNTs specified by a diameter of 0.916 nm and a chiral index of (9, 4). This results in the formation of a stacked film in which the two types of second semiconductor-type CNTs are stacked.

In the example illustrated in FIG. 10, the absorption layers 24 have two layers. For example, the absorption layers 24 has a first layer that is located on the side of the radiation layer 23 and contains the second semiconductor-type CNTs specified by the diameter of 0.916 nm and the chiral index of (9, 4), and a second layer that is stacked on the first layer and contains the second semiconductor-type CNTs specified by the diameter of 0.757 nm and the chiral index of (6, 5).

In the inset in the graph of FIG. 10, absorptivity spectra of the second semiconductor-type CNTs contained in the first and second layers of the absorption layers 24 are illustrated. As illustrated in the inset, the second semiconductor-type CNTs contained in the first layer have the largest absorption peak at a wavelength of around 1300 nm. On the other hand, the second semiconductor-type CNTs contained in the second layer have the largest absorption peak on the shorter wavelength side than the absorption peak in the first layer.

In the absorption layers 24, the absorption peak of the second semiconductor-type CNTs changes stepwise from layer to layer, so that an absorptivity spectrum over the entire two layers has a cutoff wavelength around 1300 nm on the longer wavelength side, as illustrated in the graph in FIG. 10. On the shorter wavelength side than such a cutoff wavelength, the absorption layers 24 have a very wide absorption band. For example, such an absorptivity spectrum encompasses the visible region and reaches the near-infrared region around the wavelength of 1300 nm.

Second Embodiment

Figure 11:
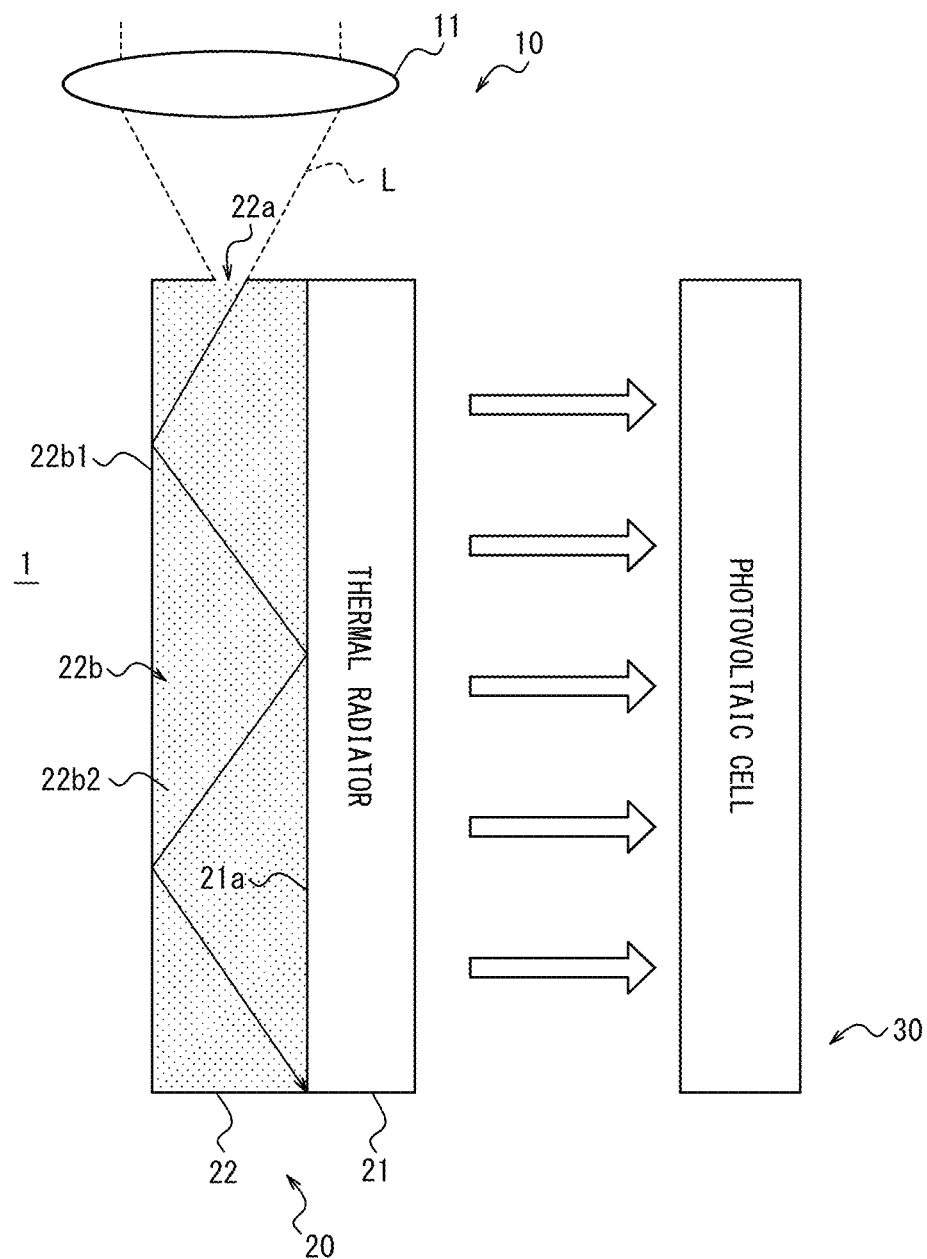
FIG. 11 is a schematic diagram of a photoelectric conversion device according to a second embodiment of the present disclosure.

FIG. 11 is a schematic diagram of a photoelectric conversion device 1 according to a second embodiment of the present disclosure. With reference to FIG. 11, the configuration and functions of the photoelectric conversion device 1 according to the second embodiment will be mainly described. The photoelectric conversion device 1 according to the second embodiment differs from that of the first embodiment in that the configuration of the light receiving unit 22 of the light spectrum conversion element 20 is different. The other configurations, functions, effects, variations, and the like are similar to those of the first embodiment, and the corresponding explanations also apply to the photoelectric conversion device 1 according to the second embodiment. In the following, similar components to those of the first embodiment are applied with the same reference signs as in the first embodiment, and a description thereof is omitted. The difference from the first embodiment will be mainly described.

The light spectrum conversion element 20 according to the second embodiment has a structure in which a light receiving unit 22 is attached to the thermal radiator 21 so as to cover a surface 21a of the thermal radiator 21 including a layer formed of the single type of first semiconductor-type CNTs, instead of the stacked structure as described in the first embodiment. For example, the light receiving unit 22 has a hole 22a that receives light from an energy source, and a confinement structure 22b that confines light incident through the hole 22a and propagates the light inside. The surface 21a of the thermal radiator 21 constitutes one face of the confining structure 22b.

More specifically, the confinement structure 22b is constituted of an enclosure member 22b1, a transparent solid 22b2 disposed inside the enclosure member 22b1, and the surface 21a located opposite the photovoltaic cell 30 in the thermal radiator 21. Not limited to this, the confinement structure 22b may have a cavity instead of the transparent solid 22b2. That is, the confinement structure 22b may be constituted of the enclosure member 22b1, the surface 21a, and the cavity enclosed thereby.

The enclosure member 22b1 may be made of a low-emissivity metal, such as gold, silver, platinum, or copper. The enclosure member 22b1 is formed as a whole in a concave shape and covers a surface of the transparent solid 22b2. The hole 22a is formed on a top surface of the enclosure member 22b1.

The transparent solid 22b2 contains any medium capable of propagating the sunlight L at a high transmittance, for example. For example, the transparent solid 22b2 may include transparent solid sapphire.

The sunlight L is focused by the light collection unit 10 and enters into the confinement structure 22b through the hole 22a. The energy of the sunlight L entering into the confinement structure 22b through the hole 22a is transmitted to the thermal radiator 21 containing the first semiconductor-type CNTs via a near field or a far field produced by internal light scattering. For example, the sunlight L is mostly absorbed by the first semiconductor-type CNTs via the near field occurring on the surface 21a of the thermal radiator 21 while propagating inside the transparent solid 22b2. Therefore, as in the first embodiment, excitons are produced in the thermal radiator 21. As described above, in the second embodiment, the light receiving unit 22 is attached to the thermal radiator 21 and directly transmits the light energy from the energy source to the thermal radiator 21.

Figure 12:
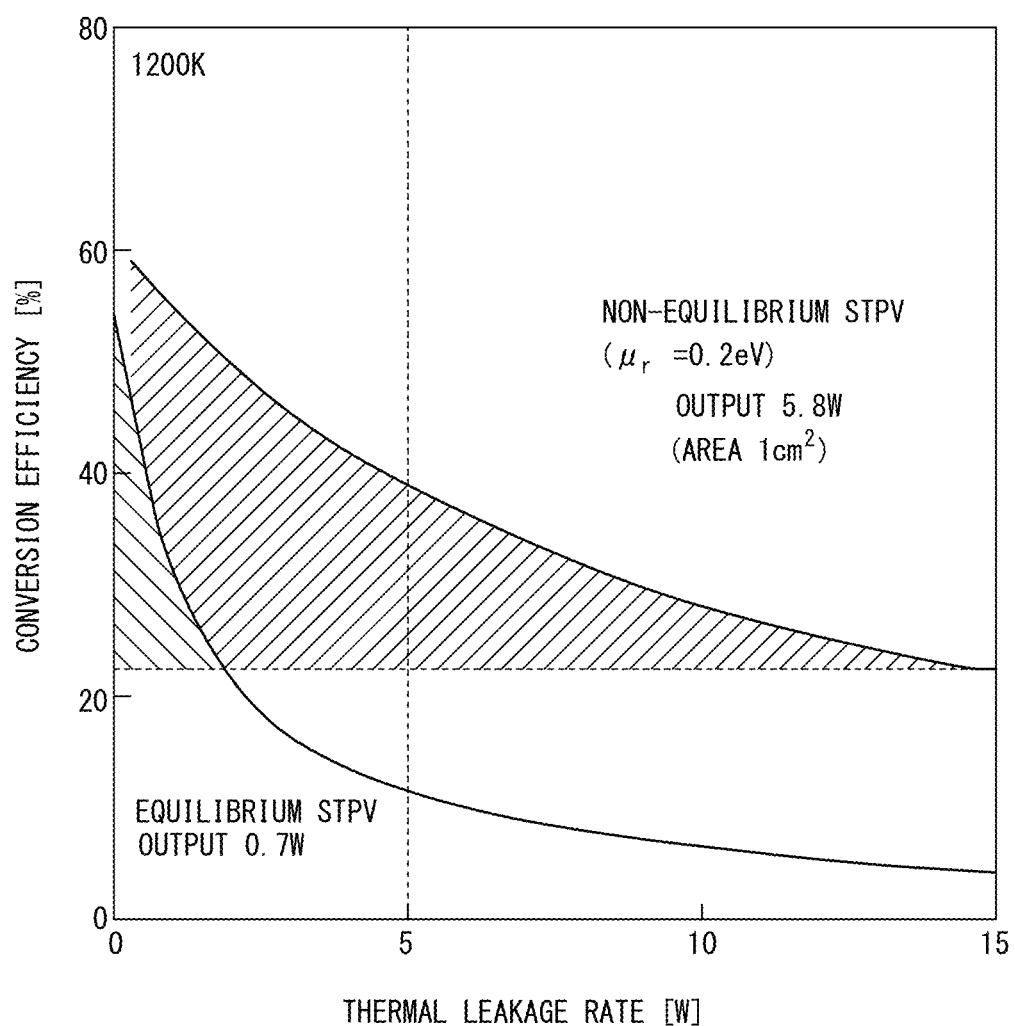
FIG. 12 is a diagram illustrating a result of a trial calculation of conversion efficiency based on the photoelectric conversion device of FIG. 11.

FIG. 12 is a diagram illustrating a result of a trial calculation of conversion efficiency based on the photoelectric conversion device 1 of FIG. 11. In FIG. 12, the horizontally dashed line indicates the so-called Shockley-Queisser limit of a photoelectric conversion cell with a band gap of 0.67 eV. For example, an estimated thermal radiation leakage from the solid sapphire used as the transparent solid 22b2 is 5 W at maximum, assuming that the area of the thermal radiator 21 is 1 cm$^2$ and the operating temperature thereof is 1200 K.

In non-equilibrium STPV using the photoelectric conversion device 1 in FIG. 11, when a thermal leakage rate is 5 W, the conversion efficiency increases to nearly 40%, which exceeds the Shockley-Queisser limit. The chemical potential $\mu_r$ of the excitons at this time is 0.2 eV, and an output from the thermal radiator 21 is 5.8 W. On the other hand, for conventional equilibrium STPV, when the thermal leakage rate is 5 W, the conversion efficiency dramatically decreases. An output from the thermal radiator at this time is 0.7 W. To obtain a conversion efficiency equivalent to 40% in conventional equilibrium STPV, the thermal leakage rate must be significantly lower.

Third Embodiment

Figure 13:
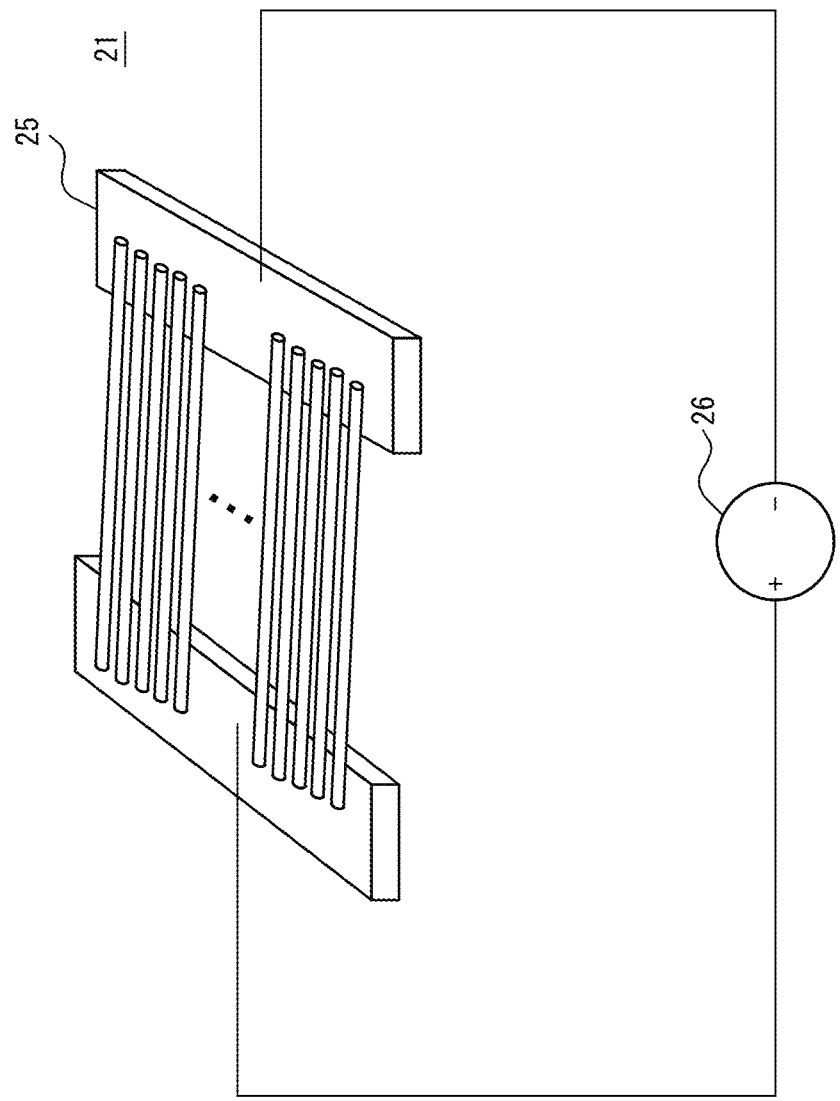
FIG. 13 is a schematic configuration diagram of a thermal radiator according to a third embodiment of the present disclosure.

FIG. 13 is a schematic configuration diagram of a thermal radiator 21 according to a third embodiment of the present disclosure. With reference to FIG. 13, the configuration and functions of the thermal radiator 21 according to the third embodiment will be mainly described. The thermal radiator 21 according to the third embodiment differs from those of the first and second embodiments in that CNTs contained in the thermal radiator 21 are not semiconductor-type but metal-type.

The other configurations, functions, effects, variations, and the like are similar to those of the first and second embodiments, and the corresponding explanations also apply to the thermal radiator 21 according to the third embodiment.

In the following, similar components to those of the first and second embodiments are applied with the same reference signs, and a description thereof is omitted. The difference from the first and second embodiments will be mainly described.

Non-equilibrium thermal radiation can be generated not only when CNTs are semiconductor-type but also when CNTs are metal-type. By applying a constant voltage of approximately 0.1 V/μm or higher and passing a current through metal-type CNTs, non-equilibrium thermal radiation is generated from the metal-type CNTs. The third embodiment mainly describes the non-equilibrium thermal radiation of the metal-type CNTs, which can be applied to, for example, high-intensity near-infrared light sources, other than power generation applications using the photovoltaic cell 30 in the first and second embodiments.

In metal-type CNTs, non-equilibrium distribution of optical phonons can be generated when electrons accelerated by an electric field collide with phonons. The interaction of such non-equilibrium optical phonons with an electron system produces excitons with chemical potential higher than zero. Therefore, radiation produced by the radiative recombination of such excitons is non-equilibrium thermal radiation with chemical potential higher than zero. A method for confirming that the chemical potential is maintained higher than zero is the same as for the semiconductor-type CNTs in the first and second embodiments.

The thermal radiator 21 contains first CNTs in which excitons produced based on the energy from the energy source have energy consistent with a wavelength region within a range from the visible region to the near-infrared region. The chemical potential of the excitons is maintained higher than zero. The first CNTs include metal-type CNTs.

The diameter d of the metal-type CNTs contained in the thermal radiator 21 may be 1.2 nm≤d≤3.5 nm. The chiral index (n, m) of the metal-type CNTs may include a pair of integers in which n-m is 0 or a multiple of 3. For example, for the metal-type CNTs, the diameter d may satisfy any one of the conditions of 1.2 nm≤d≤2.5 nm and 2.5 nm≤d≤3.5 nm, and the chiral index (n, m) may include a pair of integers in which n-m is 0 or a multiple of 3. For example, for the metal-type CNTs, the diameter may be d=2.71 nm and the chiral index may be (24, 15).

As illustrated in FIG. 13, the thermal radiator 21 has a plurality of elongated rod-shaped metal-type CNTs that generate non-equilibrium thermal radiation when heated by current injection. Such metal-type CNTs are arranged along one direction. The intervals between one metal-type CNT and another metal-type CNT adjacent to the one metal-type CNT is approximately constant.

The thermal radiator 21 is a unit of the metal-type CNTs bridged over a pair of electrodes 25. A power supply 26 is connected to the pair of electrodes 25. The power supply 26 and the pair of electrodes 25 inject an electric current into the metal-type CNTs to heat the metal-type CNTs.

The thermal radiator 21 may have only one set of such a unit, or may have a plurality of sets. The thermal radiator 21, for example, can have a plurality of sets of such units, and the plurality of sets of the units can be stacked or integrated with each other to achieve high strength as a device.

The diameter of the metal-type CNTs contained in the thermal radiator 21 is, for example, 1 nm or more and 4 nm or less, but is not limited to this. For example, the diameter of the metal-type CNTs may be 0.6 nm or more and 3.0 nm or less, similar to the diameter d of the first and second semiconductor-type CNTs in the first embodiment. The density of the number of metal-type CNTs per unit is, for example, on the order of 500,000/d (pcs/mm$^2$) when CNTs with a diameter of d nm are used, but is not limited to this.

Figure 14:
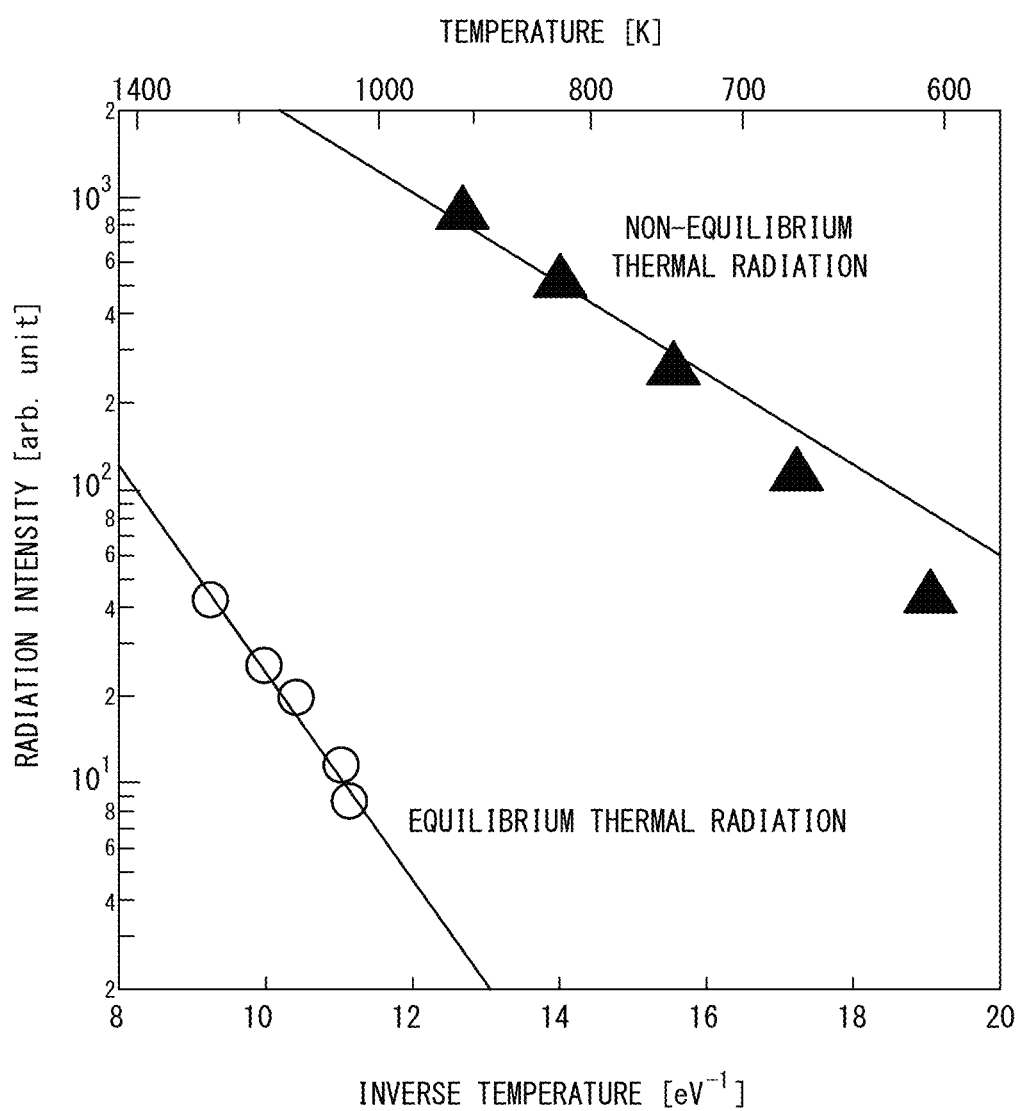
FIG. 14 is a diagram illustrating the temperature dependence of radiation intensity based on non-equilibrium thermal radiation from a single metal-type CNT of FIG. 13.

FIG. 14 is a diagram illustrating the temperature dependence of radiation intensity based on non-equilibrium thermal radiation from a single metal-type CNT of FIG. 13.

In FIG. 14, the triangles represent experimental results of measuring the temperature dependence of radiation intensity of the non-equilibrium thermal radiation generated when the single metal-type CNT is heated by current injection. The solid line overlapping the triangles indicates a fitting result based on the generalized Planck law.

In FIG. 14, the circles represent experimental results of measuring the temperature dependence of radiation intensity of equilibrium thermal radiation generated when a single metal-type CNT is heated by a laser. The circles indicate the temperature dependence of the radiation intensity based on the equilibrium thermal radiation when chemical potential p is zero. The solid line overlapping the circles indicates a fitting result based on the Planck law.

For the experimental results illustrated in FIG. 14, the structure of the metal-type CNT is represented by a chiral index of (24, 15). The diameter of the metal-type CNT is 2.67 nm. The length of the metal-type CNT is approximately 20 μm. For experiments to obtain the non-equilibrium thermal radiation, an applied voltage is 1.5 to 1.9 V, and a current is approximately 4 μA.

The experimental results plotted in FIG. 14 indicate the temperature dependence of the higher radiation intensity based on the non-equilibrium thermal radiation, completely deviating from the temperature dependence of the radiation intensity based on the equilibrium thermal radiation. When compared at the same temperature, e.g., 1000 K, the radiation intensity based on the non-equilibrium thermal radiation is two or more orders of magnitude higher than radiation intensity based on the equilibrium thermal radiation. In other words, light with an intensity two or more orders of magnitude higher than that of the equilibrium thermal radiation is emitted as the non-equilibrium thermal radiation.

Figure 15:
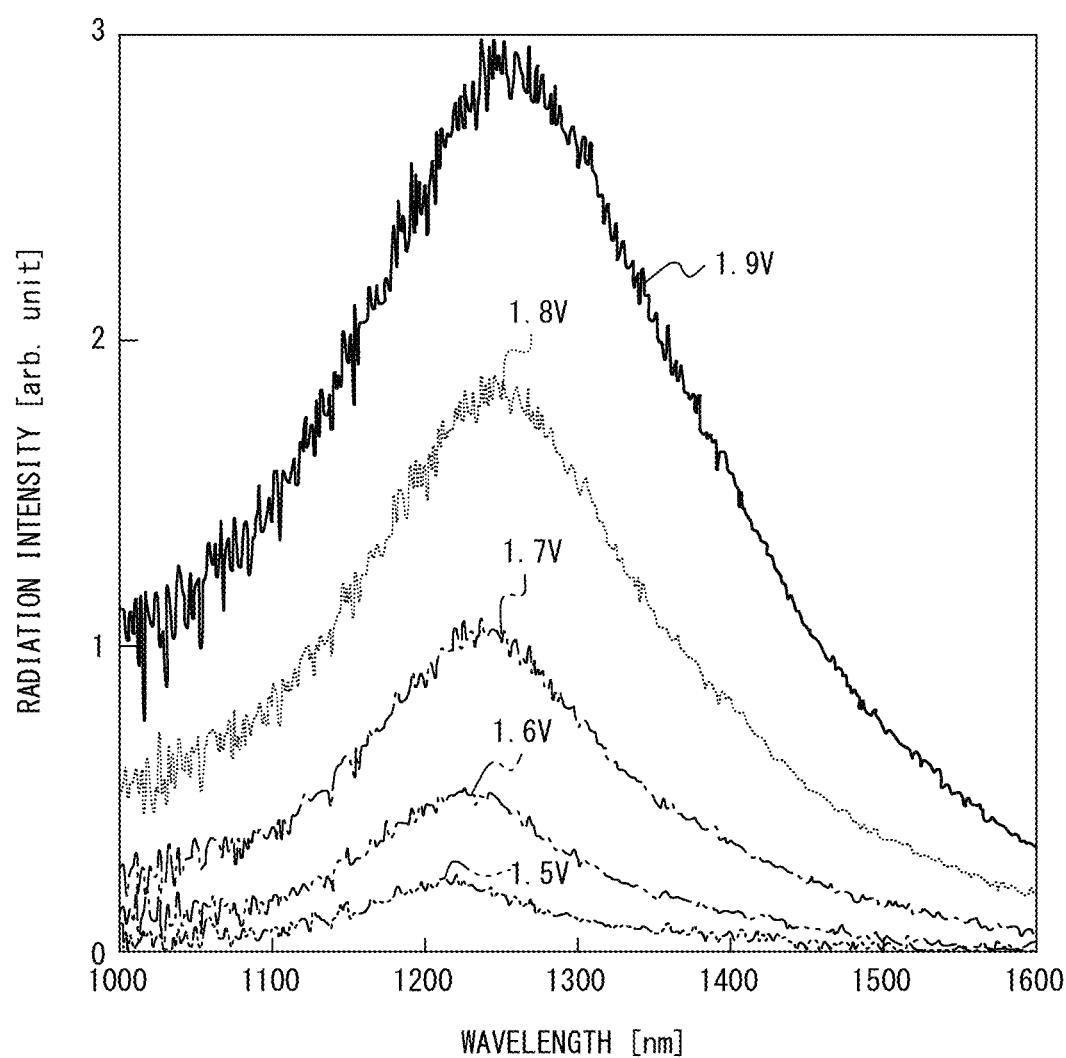
FIG. 15 is a diagram illustrating the dependence of non-equilibrium thermal radiation spectra of the thermal radiator of FIG. 13 on applied voltage.

FIG. 15 is a diagram illustrating the dependence of non-equilibrium thermal radiation spectra of the thermal radiator 21 of FIG. 13 on applied voltage. As illustrated in FIG. 15, radiation intensity of the non-equilibrium thermal radiation generated when the metal-type CNTs contained in the thermal radiator 21 are heated by injecting electric current into the metal-type CNTs increases as the applied voltage increases. In other words, the radiation intensity of the non-equilibrium thermal radiation increases as the applied voltage increases, as the current injected into the metal-type CNTs increases, and as the amount of heating of the metal-type CNTs increases. This corresponds to FIG. 14 in which the radiation intensity based on the non-equilibrium thermal radiation is higher as the temperature of the metal-type CNTs increases.

(Effects)

According to the embodiments described above, under a constant thermal leakage rate, the conversion efficiency is improved when the electric power is obtained in the photovoltaic cell 30 based on the energy from the energy source. For example, by maintaining the chemical potential of the excitons of the first CNTs contained in the thermal radiator 21 higher than zero, the thermal radiator 21 generates the non-equilibrium thermal radiation. This allows an energy transmission rate, which is conventionally governed by the Planck law, to be sufficiently greater than the thermal leakage rate in the light receiving unit 22 and the thermal radiator 21.

For example, as illustrated in FIG. 12, non-equilibrium STPV provides sufficient conversion efficiency even when the thermal leakage rate is high. Conversely, the light spectrum conversion element 20 can also lower its operating temperature when trying to obtain the same thermal radiation intensity as equilibrium STPV. Thus, safety, durability, and thermal leakage saving are improved by lowering the operating temperature.

The light spectrum conversion element 20 has the light receiving unit 22 that is attached to the thermal radiator 21 and transmits the light energy from the energy source to the thermal radiator 21, thereby enabling the efficient conversion of the light energy from the sun and other sources into the excitons of the first CNTs.

In conventional STPV, all of light energy from the sun is converted into thermal energy at light receiving units. On the other hand, in the light spectrum conversion element 20, by having the stacked structure including the semiconductor-type CNTs as in the first embodiment, part of the light energy from the sun is converted into thermal energy, but the rest is converted into the excitons with chemical potential higher than zero. The light spectrum conversion element 20 is capable of transmitting the energy held as the excitons in the light receiving unit 22 and the thermal radiator 21 to the photovoltaic cell 30 before the energy escapes to the outside as heat. This allows the energy transmission rate to be sufficiently greater than the thermal leakage rate and to improve the conversion efficiency.

In the first embodiment, the second semiconductor-type CNTs are specified by diameters and chiral indices such that the energy of the excitons produced by the absorption of the light energy from the energy source is higher than the energy of the excitons in the first semiconductor-type CNTs. As a result, light energy on the shorter wavelength side than the wavelength of the radiation peak of the non-equilibrium thermal radiation generated in the thermal radiator 21 is absorbed in the light receiving unit 22. For example, the light spectrum conversion element 20 can absorb most wavelength components of the sunlight by having the spectral characteristics illustrated in FIG. 3. Conversely, the light spectrum conversion element 20 does not absorb light energy on the longer wavelength side than the wavelength of the radiation peak of the non-equilibrium thermal radiation. Therefore, energy loss based on thermal radiation is suppressed.

In the first embodiment, the exciton energy of the first and second semiconductor-type CNTs is higher in the layer located on the side of the energy source, which enables the formation of a chemical potential gradient in the light receiving unit 22 and the thermal radiator 21. The exciton energy tends to be higher as the diameter of the semiconductor-type CNTs decreases, and is determined by the chiral index. This allows the light receiving unit 22 to quickly and unilaterally transmit energy to the thermal radiator 21 via the excitons generated by the light energy from the sun. This ensures that the energy transmission rate is sufficiently greater than the thermal leakage rate to improve the conversion efficiency.

By having the configuration of the light receiving unit 22 as in the second embodiment, the light spectrum conversion element 20 can have a simpler structure compared to the stacked structure of the first embodiment. In addition, since the sunlight can directly interact with the thermal radiator 21, the light spectrum conversion element 20 can improve the efficiency of interaction with the sunlight even if the sunlight leaks slightly from the confinement structure 22b due to the hole 22a in the light receiving unit 22.

(Variations)

It is obvious to those skilled in the art that the present disclosure can be realized in other predetermined forms other than the embodiments described above without departing from its spirit or its essential features. Therefore, the preceding description is exemplary and not limiting. The scope of the disclosure is defined by the appended claims, not by the preceding description. Any modifications, some of which are within the scope of the equivalents of the disclosure, are assumed to be encompassed in the disclosure.

For example, the shape, arrangement, orientation, and number of each component described above are not limited to those illustrated in the above description and drawings. The shape, arrangement, orientation, number, and the like of each component may be configured arbitrarily as long as the function can be realized.

In the above embodiment, the semiconductor materials used in the light spectrum conversion element 20 are described as the CNTs, but are not limited to this. The light spectrum conversion element 20 may be formed of any semiconductor materials as long as the light spectrum conversion element 20 is capable of generating the non-equilibrium thermal radiation having the energy consistent with the sensitivity region of the photovoltaic cell 30 by the annihilation of the excitons generated based on the energy from the energy source. For example, the semiconductor materials may include other materials such as SiC or atomic layer semiconductors (transition metal dichalcogenides).

In the above embodiments, the chiral index of the first semiconductor-type CNTs contained in the radiation layer 23 is described as (10, 3), but is not limited to this. The chiral index of the first semiconductor-type CNTs may be any value such that the excitons produced based on the energy from the energy source have energy consistent with the sensitivity region of the photovoltaic cell 30 and the chemical potential of the excitons is maintained higher than zero.

In the above embodiments, the thermal radiator 21 is described as being used for STPV, but it is not limited to this. The thermal radiator 21 may be used in TPV. In other words, the energy from the energy source is not limited to the light energy from the sun.

In the above embodiments, the thermal radiator 21 is described as including the single radiation layer 23, but is not limited to this. The thermal radiator 21 may include a plurality of radiation layers 23.

In the above embodiments, the radiation layer 23 of the thermal radiator 21 is described as being formed of the single type of first CNTs, but is not limited to this. The radiation layer 23 may be formed by a plurality of types of first CNTs. For example, the radiation layer 23 may be formed such that a single layer contains a plurality of types of first CNTs, or a plurality of layers may contain different types of first CNTs from each other.

In the above first embodiment, the first semiconductor-type CNTs and the second semiconductor-type CNTs are described as being of different types from each other, but are not limited to this. The first semiconductor-type CNTs and the second semiconductor-type CNTs may be of the same type as each other. In other words, the same type of semiconductor-type CNTs may be contained in the radiation layer 23 and the absorption layers 24.

In the above first embodiment, each of the absorption layers 24 of the light receiving unit 22 is described as being formed by the single type of second semiconductor-type CNTs, but is not limited to this. Each of the absorption layers 24 may be formed of a plurality of types of second semiconductor-type CNTs. The absorption layers 24 of the light receiving unit 22 are described as containing the different types of second semiconductor-type CNTs from each other, but are not limited to this. The absorption layers 24 may include the same type of second semiconductor-type CNTs as each other.

In the above first embodiment, the second semiconductor-type CNTs are described as being specified by the diameters and the chiral indices such that the energy of the excitons produced by the absorption of the light energy from the energy source is higher than the energy of the excitons in the first semiconductor-type CNTs, but are not limited to this. The energy of the excitons in the second semiconductor-type CNTs and the energy of the excitons in the first semiconductor-type CNTs may be the same as each other. The second semiconductor-type CNTs may be specified with diameters and chiral indices that achieve such energy of excitons.

In the above first embodiment, the diameters of the first semiconductor-type CNTs and the second semiconductor-type CNTs are described as being smaller in the layers located on the side of the energy source, but are not limited to this. The diameters of the first semiconductor-type CNTs and the second semiconductor-type CNTs may be determined based on any relationship that enables the above non-equilibrium thermal radiation in the light spectrum conversion element 20. In other words, the radiation layer 23 and the absorption layers 24 may include any type of semiconductor-type CNTs based on such relationship.

In the above first embodiment, the diameters of the first semiconductor-type CNTs and the second semiconductor-type CNTs are described as being 0.6 nm or more and 3.0 nm or less, but are not limited to this. The diameters of the first semiconductor-type CNTs and the second semiconductor-type CNTs may be any values that enable the above non-equilibrium thermal radiation in the light spectrum conversion element 20.

In the above first embodiment, the light receiving unit 22 is described as being composed of the stacked structure containing the second semiconductor-type CNTs, but is not limited to this. The light receiving unit 22 may be composed of photonic crystals instead of or in addition to the stacked structure containing the semiconductor-type CNTs.

Figure 16:
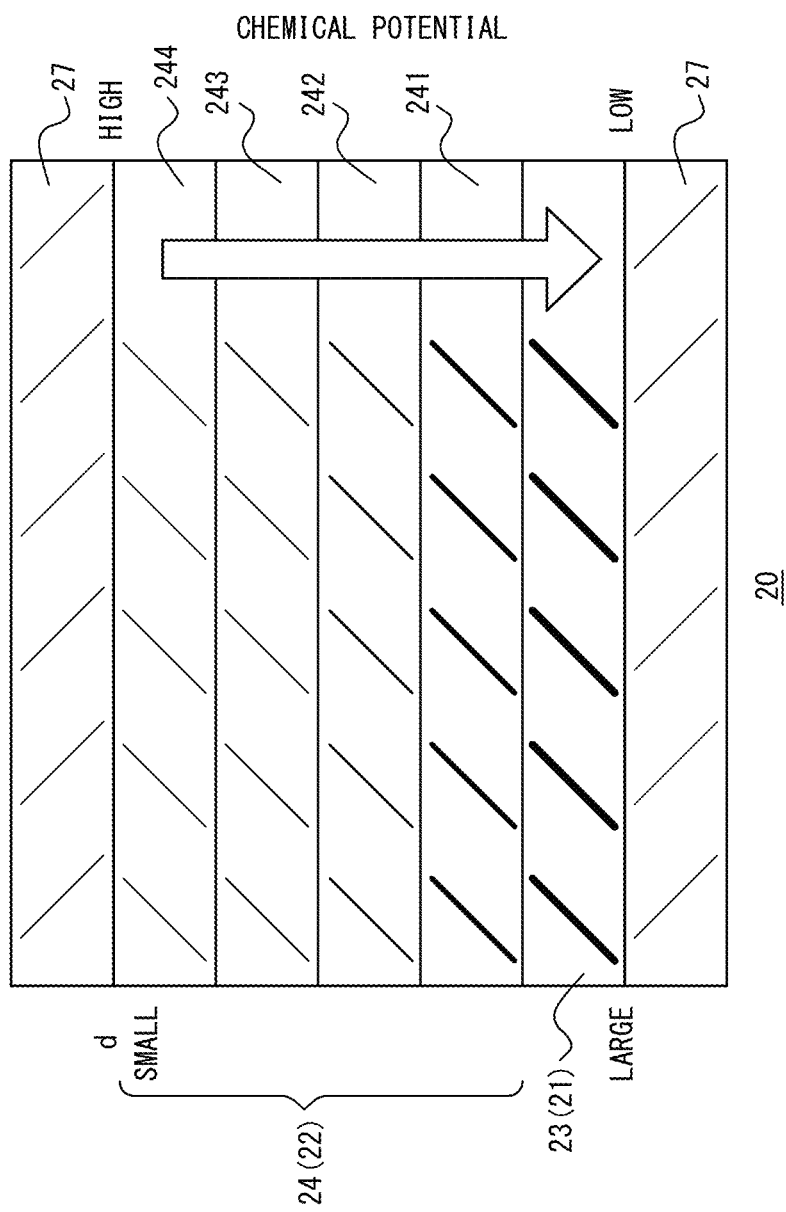
FIG. 16 is a schematic diagram, corresponding to FIG. 2, illustrating a variation of the stacked structure of the light spectrum conversion element of FIG. 1.

FIG. 16 is a schematic diagram, corresponding to FIG. 2, illustrating a variation of the stacked structure of the light spectrum conversion element 20 of FIG. 1.

In the above first embodiment, a stacked body including the radiation layer 23 and the absorption layers 24 is described as having no layers other than the radiation layer 23 and the absorption layers 24, as illustrated in FIG. 2, but is not limited to this. As illustrated in FIG. 16, the light spectrum conversion element 20 may further have low refractive index layers 27. The low refractive index layer 27 is stacked on at least one of both sides of the stacked body, which includes the radiation layer 23 and the at least one absorption layer 24, in a stacking direction. For example, the low refractive index layer 27 is stacked on a top surface of the absorption layer 244, which is disposed on the side closest to the energy source in the absorption layers 24. The low refractive index layer 27 is stacked on a bottom surface of the radiation layer 23.

The low refractive index layers 27 are formed of a material with a lower refractive index than the first semiconductor-type CNTs contained in the radiation layer 23 and the second semiconductor-type CNTs contained in the absorption layers 24. Such a material may include, for example, any material having a refractive index that is lower than the refractive index of the CNTs and closer to the refractive index 1 of air than the CNTs. For example, the low refractive index layers 27 may be formed of boron nitride nanotubes that have insulating properties and high heat resistance. The refractive index of boron nitride nanotubes is on the order of 1.4.

When the low refractive index layers 27 are formed of the boron nitride nanotubes, the same manufacturing process for forming the radiation layer 23 and the absorption layers 24 can be used for deposition. The low refractive index layers 27 formed of the boron nitride nanotubes are transparent at the wavelengths of the non-equilibrium thermal radiation by the thermal radiator 21.

By stacking such a low refractive index layers 27 on at least one of both the sides of the stacked body in the stacking direction, the low refractive index layer 27 acts like a support, and the physical strength of the stacked body is improved. This reinforcing effect becomes more conspicuous when the low refractive index layers 27 are provided on both the sides of the stacked body in the stacking direction, as illustrated in FIG. 16.

In addition, since the low refractive index layers 27 are formed of the material with the refractive index closer to the refractive index 1 of air than the CNTs, the low refractive index layers 27 also have the function of suppressing the reflection of light. If the low refractive index layers 27 are not formed, since the difference in the refractive index between air and the CNTs is large, the reflection of light increases when the light enters the absorption layers 24 from the air and when the light exits from the radiation layer 23 into the air. This reduces the radiation intensity of the non-equilibrium thermal radiation from the light spectrum conversion element 20.

The light spectrum conversion element 20 can suppress, by having the low refractive index layers 27, the reflection of light by reducing the difference in the refractive index between air and the CNTs. Thus, the light spectrum conversion element 20 can improve the overall efficiency of interaction with the sunlight by increasing the absorption efficiency of the absorption layers 24 and the radiation efficiency of the radiation layer 23. As a result, the light spectrum conversion element 20 can increase the radiation intensity of the non-equilibrium thermal radiation.

Since the low refractive index layers 27 are stacked on both the sides of the stacked body in the stacking direction, light is repeatedly reflected inside the stacked body, thus further increasing the absorption efficiency of the absorption layers 24. The light spectrum conversion element 20 can further increase the radiation intensity of the non-equilibrium thermal radiation by increasing the absorptivity of light in the absorption layers 24.

Figure 17:
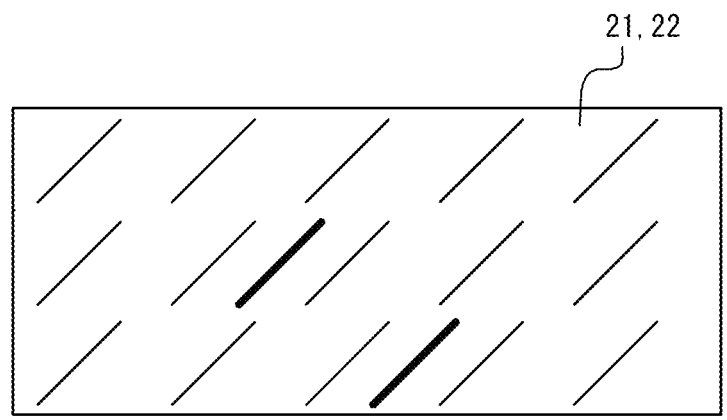
FIG. 17 is a schematic diagram, corresponding to FIG. 2, illustrating a variation of the light spectrum conversion element of FIG. 1.

FIG. 17 is a schematic diagram, corresponding to FIG. 2, illustrating a variation of the light spectrum conversion element 20 of FIG. 1.

In the above first embodiment, as illustrated in FIG. 2, the thermal radiator 21 and the light receiving unit 22 are formed as different layers from each other, but are not limited to this. The light receiving unit 22 may be formed as the same layer as the thermal radiator 21, as illustrated in FIG. 17. In this case, the light receiving unit 22 contains the second semiconductor-type CNTs that are different from the first semiconductor-type CNTs, and the second semiconductor-type CNTs absorb the light energy from the energy source and transmit the light energy to the first semiconductor-type CNTs.

In the second semiconductor-type CNTs forming the light receiving unit 22, the chemical potential of the excitons is higher than that in the first semiconductor-type CNTs forming the thermal radiator 21. The light spectrum conversion element 20 is formed, in one layer, with a greater proportion of the second semiconductor-type CNTs with higher chemical potential of excitons and a smaller proportion of the first semiconductor-type CNTs with lower chemical potential of excitons. In the layer constituting the light spectrum conversion element 20, the first semiconductor-type CNTs are present locally while the second semiconductor-type CNTs are present throughout.

The light spectrum conversion element 20 can be more easily manufactured with the structure illustrated in FIG. 17, compared to the stacked structure illustrated in FIG. 2. The light spectrum conversion element 20 can convert the light energy from the energy source into the non-equilibrium thermal radiation with a simpler structure.

In the above second embodiment, the light receiving unit 22 is described as being attached only to the surface 21a of the thermal radiator 21, but is not limited to this. The light receiving unit 22 may be attached to another surface of the thermal radiator 21 instead of or in addition to the surface 21a.

In the above second embodiment, as illustrated in FIG. 11, the light receiving unit 22 is described as having only one hole 22a formed on the top surface of the enclosure member 22b1, but is not limited to this. The shape, size, arrangement, orientation, and number of holes 22a formed in the light receiving unit 22 may be configured arbitrarily, as long as the function of accepting the light from the energy source can be realized. For example, the hole 22a may be formed on at least one of side and bottom surfaces of the enclosure 22b1 instead of, or in addition to, the top surface of the enclosure 22b1. For example, a plurality of holes 22a may be formed on one face of the enclosure member 22b1.

In the above second embodiment, the light receiving unit 22 is described as having the hole 22a for receiving the light from the energy source, but is not limited to this. Instead of or in addition to such a hole 22a, the light receiving unit 22 may have any optical element that transmits the sunlight L at a predetermined transmittance at one face of the enclosure member 22b1 and guides the sunlight L into the confinement structure 22b. As with the hole 22a, such an optical element may be of any shape, size, arrangement, orientation, number, and the like that can realize the function of accepting the light from the energy source.

In the above second embodiment, the enclosure member 22b1 is described as being formed as a whole in a concave shape, but is not limited to this. The enclosure member 22b1 may be formed in any shape that enables the light incident through the hole 22a to be confined and propagated inside. For example, the enclosure member 22b1 may be formed in a spherical shape, such as an integrating sphere.

In the above second embodiment, the enclosure member 22b1 is described as covering the entire surface 21a of the thermal radiator 21 together with the transparent solid 22b2, but is not limited to this. The enclosure member 22b1 may cover only part of the surface 21a of the thermal radiator 21 together with the transparent solid 22b2. In other words, the confinement structure 22b may be constituted of the enclosure member 22b1, the transparent solid 22b2 disposed inside the enclosure member 22b1, and the part of the surface 21a opposite the photovoltaic cell 30 in the thermal radiator 21.

The light spectrum conversion element 20 may be realized by only one of the first and second embodiments described above, or by a combination of both the first and second embodiments. For example, the light spectrum conversion element 20 may be realized such that the transparent solid 22b2 is disposed on the stacked structure constituted of the radiation layer 23 and the absorption layers 24. In this case, the confinement structure 22b may be constituted of the enclosure member 22b1, the transparent solid 22b2 and the absorption layers 24 disposed inside the enclosure member 22b1, and part of the surface 21a opposite the photovoltaic cell 30 in the radiation layer 23.

REFERENCE SIGNS LIST 1 photoelectric conversion device
10 light collection unit
11 lens
12 shield
20 light spectrum conversion element
21 thermal radiator
21a surface
22 light receiving unit
22a hole
22b confinement structure
22b1 enclosure member
22b2 transparent solid
23 radiation layer
24 absorption layer
241 absorption layer
242 absorption layer
243 absorption layer
244 absorption layer
25 electrode
26 power supply
27 low refractive index layer
30 photovoltaic cell
L sunlight

The invention claimed is:

1. A thermal radiator comprising first carbon nanotubes (CNTs) in which excitons produced based on energy from an energy source have energy consistent with a wavelength region within a range from a visible region to a near-infrared region,
   wherein chemical potential of the excitons is maintained higher than zero.

2. The thermal radiator according to claim 1, wherein the first CNTs consist essentially of semiconductor-type CNTs, and the wavelength region corresponds to a sensitivity region of a photovoltaic cell.

3. The thermal radiator according to claim 2, wherein a diameter d of the first CNTs is 0.6 nm≤d≤3.5 nm.

4. The thermal radiator according to claim 3, wherein the diameter d is 0.6 nm≤d≤2.5 nm.

5. The thermal radiator according to claim 2, wherein the energy from the energy source includes light energy from sun.

6. The thermal radiator according to claim 1, wherein the first CNTs consist essentially of metal-type CNTs.

7. The thermal radiator according to claim 6, wherein a diameter d of the first CNTs is 1.2 nm≤d≤3.5 nm.

8. A light spectrum conversion element comprising:
the thermal radiator according to claim 2; and
a light receiving unit attached to the thermal radiator, the light receiving unit being configured to transmit light energy from the energy source to the thermal radiator.

9. The light spectrum conversion element according to claim 8, wherein
the thermal radiator includes a radiation layer formed of a single type of the first CNTs; and
the light receiving unit includes at least one absorption layer each formed of semiconductor-type second CNTs different from the first CNTs, the at least one absorption layer being stacked on the radiation layer.

10. The light spectrum conversion element according to claim 9, wherein the second CNTs are specified by a diameter and a chiral index such that energy of excitons produced by absorption of the light energy from the energy source is higher than energy of excitons in the first CNTs.

11. The light spectrum conversion element according to claim 9, wherein diameters of the first CNTs and the second CNTs are smaller in a layer located on a side of the energy source.

12. The light spectrum conversion element according to claim 9, wherein for each the first CNTs and the second CNTs, a diameter d is 0.6 nm≤d≤3.0 nm, and a chiral index (n, m) includes a pair of integers of 5≤n≤50 and 0≤m≤n.

13. The light spectrum conversion element according to claim 9, further comprising a lower refractive index layer stacked on at least one of both sides of a stacked body including the radiation layer and the at least one absorption layer in a stacking direction, the lower refractive index layer being formed of a material with a lower refractive index than the first CNTs and the second CNTs.

14. The light spectrum conversion element according to claim 13, wherein the lower refractive index layer includes boron nitride nanotubes.

15. A light spectrum conversion element comprising:
the thermal radiator according to claim 2; and
a light receiving unit formed as a same layer as the thermal radiator, the light receiving unit containing semiconductor-type second CNTs different from the first CNTs, the second CNTs being configured to absorb light energy from the energy source and transmit the light energy to the first CNTs.

16. A photoelectric conversion device comprising:
the thermal radiator according to claim 2; and
the photovoltaic cell configured to convert light energy emitted by annihilation of excitons in the first CNTs into electrical energy.

* * * * *